(12) United States Patent
Satoh et al.

(10) Patent No.: US 10,882,531 B2
(45) Date of Patent: Jan. 5, 2021

(54) CONTROL APPARATUS FOR VEHICLE DRIVE-FORCE TRANSMITTING APPARATUS

(71) Applicant: TOYOTA JIDOSHA KABUSHIKI KAISHA, Toyota (JP)

(72) Inventors: Naonari Satoh, Toyota (JP); Atsushi Ayabe, Toyota (JP); Kunio Hattori, Nagoya (JP); Yusuke Ohgata, Miyoshi (JP); Shinji Oita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/571,388

(22) Filed: Sep. 16, 2019

(65) Prior Publication Data

US 2020/0122729 A1  Apr. 23, 2020

(30) Foreign Application Priority Data

Oct. 18, 2018  (JP) ................................ 2018-197047

(51) Int. Cl.
  *B60W 30/19*  (2012.01)
  *B60W 10/10*  (2012.01)
  (Continued)

(52) U.S. Cl.
  CPC ............ *B60W 30/19* (2013.01); *B60W 10/10* (2013.01); *F16H 37/0846* (2013.01); *F16H 2061/0087* (2013.01); *F16H 2306/14* (2013.01)

(58) Field of Classification Search
  None
  See application file for complete search history.

(56) References Cited

U.S. PATENT DOCUMENTS 7,841,455 B2 * 11/2010 Maki ..................... F16H 61/061
  192/3.58
2010/0125021 A1 * 5/2010 Matsubara ............ B60W 10/08
  477/5

(Continued)

FOREIGN PATENT DOCUMENTS

CN  105190118 A  12/2015
CN  108138927 A  6/2018
(Continued)

OTHER PUBLICATIONS

U.S. Appl. No. 16/572,686, filed Sep. 17, 2019 in the name of Kunio Hattori et al.

(Continued)

*Primary Examiner* — Justin Holmes
(74) *Attorney, Agent, or Firm* — Oliff PLC

(57) ABSTRACT

A control apparatus for a vehicle drive-force transmitting apparatus that defines (i) a first drive-force transmitting path established by engagement of a first engagement device controlled by an on-off solenoid valve and (ii) a second drive-force transmitting path established by engagement of a second engagement device controlled by a linear solenoid valve. A third engagement device, which is, as well as the first engagement device, disposed in the first drive-force transmitting path, is configured to transmit a drive force during a driving state of the vehicle and to cut off transmission of the drive force during a driven state of the vehicle. In a case in which the second drive-force transmitting path is to be established in place of the first drive-force transmitting path, the second engagement device is engaged when the first engagement device is engaged, and the first engagement device is released after an inertia phase is started.

9 Claims, 6 Drawing Sheets

(51) Int. Cl.
*F16H 37/08* (2006.01)
*F16H 61/00* (2006.01)

(56) References Cited

U.S. PATENT DOCUMENTS

| | | | |
|---|---|---|---|
| 2015/0184740 A1* | 7/2015 | Masunaga | F16H 61/0213 |
| | | | 701/51 |
| 2016/0052522 A1* | 2/2016 | Matsuo | B60W 10/02 |
| | | | 74/664 |
| 2018/0274643 A1 | 9/2018 | Okoshi et al. | |

FOREIGN PATENT DOCUMENTS

| | | |
|---|---|---|
| JP | 2014-004941 A | 1/2014 |
| JP | 2015-113932 A | 6/2015 |

OTHER PUBLICATIONS

U.S. Appl. No. 16/572,794, filed Sep. 17, 2019 in the name of Hiromitsu Nitani et al.

* cited by examiner

FIG.4

| | TABLE | | | |
|---|---|---|---|---|
| | C1 | C2 | B1 | TWC |
| P | | | | |
| R | | | ○ | ○ |
| N | | | | |
| D (D1) | ○ | | | |
| D (D2) | | ○ | | |
| M (M1) | ○ | | | ○ |
| M (M2) | | ○ | | |

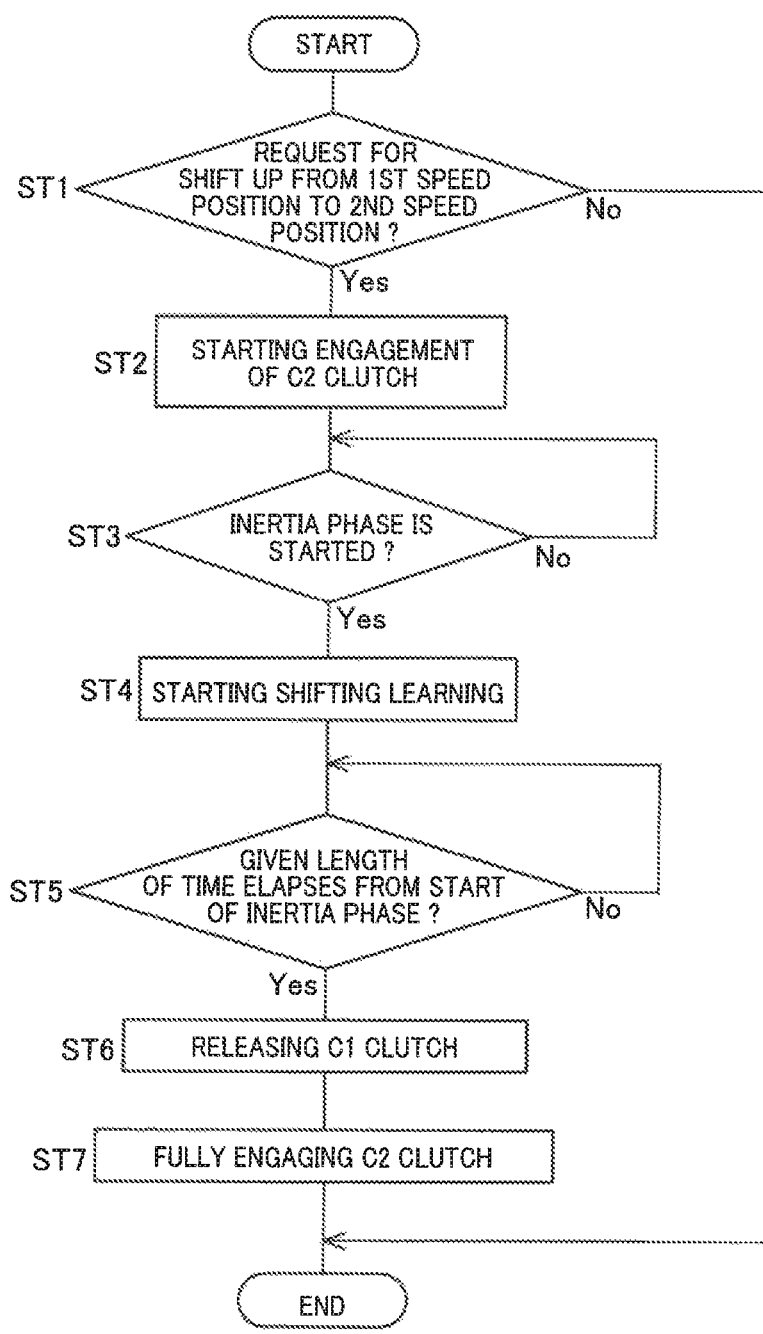

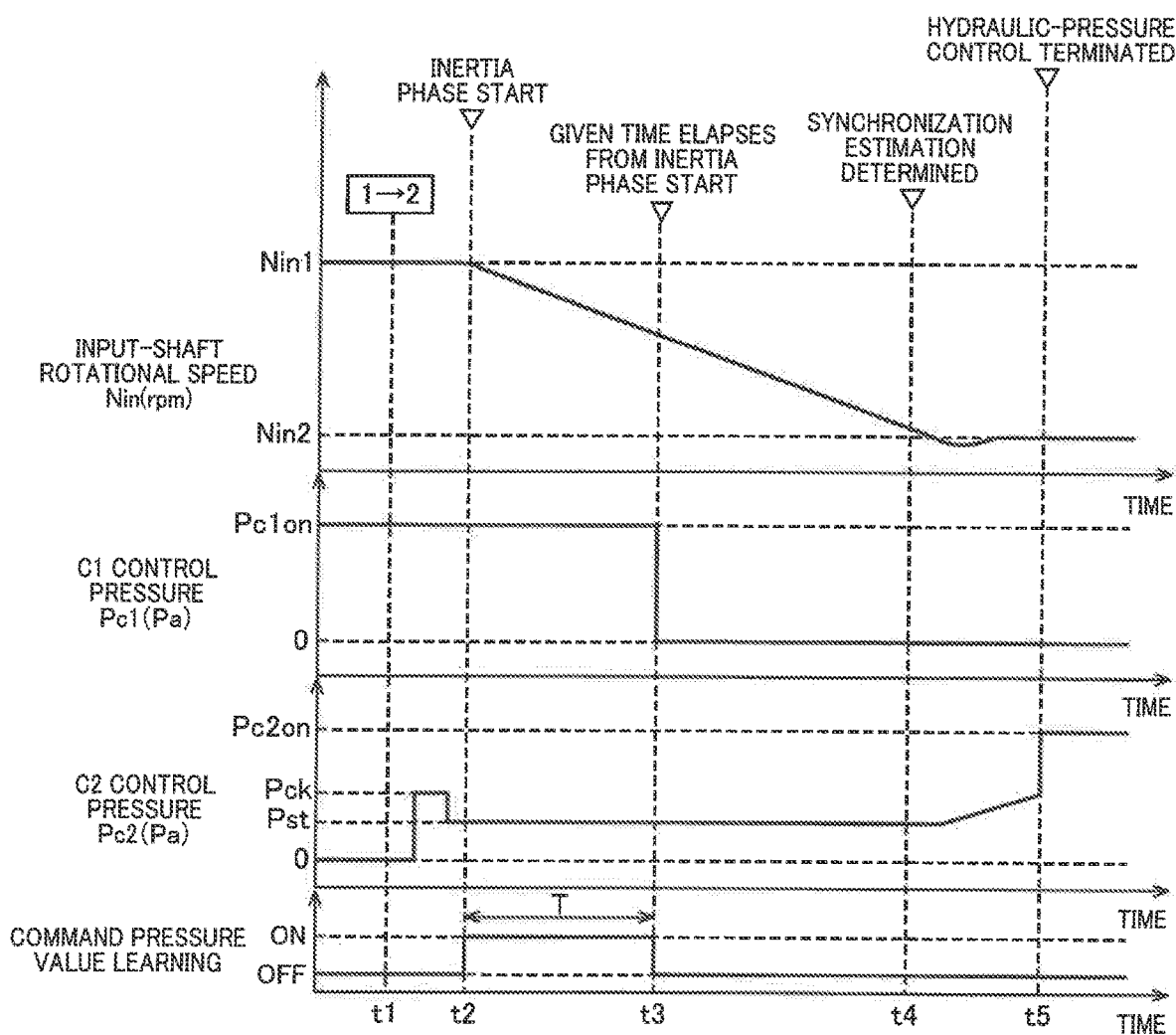

CONTROL APPARATUS FOR VEHICLE DRIVE-FORCE TRANSMITTING APPARATUS

This application claims priority from Japanese Patent Application No. 2018-197047 filed on Oct. 18, 2018, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus defines a plurality of drive-force transmitting paths.

BACKGROUND OF THE INVENTION

There is known a drive-force transmitting apparatus that is to be provided in a vehicle, wherein the drive-force transmitting apparatus defines a plurality of drive-force transmitting paths provided between an input shaft and an output shaft of the drive-force transmitting apparatus, and includes engagement devices configured to connect and disconnect the drive-force transmitting paths. As an example of such a drive-force transmitting apparatus, JP2015-113932A discloses a hybrid driving apparatus. In the hybrid driving apparatus disclosed in the Japanese Patent Application Publication, in a switching transition from one of the drive-force transmitting paths to another of the drive-force transmitting paths (in a process of a shifting action in the Japanese Patent Application Publication), a shock generated in the switching transition is minimized or reduced by a so-called "clutch-to-clutch control" that is executed for engaging an engagement device (that is to be engaged) while releasing another engagement device (that is to be released).

SUMMARY OF THE INVENTION

By the way, for reducing the manufacturing cost, it might be possible to change a solenoid valve used for controlling a hydraulic pressure applied to at least one of engagement devices provided in the drive-force transmitting apparatus, from a linear solenoid valve to an on-off solenoid valve. However, where the hydraulic pressure applied to an engagement device is controlled by an on-off solenoid valve, the applied hydraulic pressure cannot be finely controlled. Therefore, for example, there is a risk of generation of a shock in a switching transition from one of the drive-force transmitting paths to another of the drive-force transmitting paths, wherein the engagement device (to which the hydraulic pressure controlled by an on-off solenoid valve is applied) is to be released in the switching transition, because the clutch-to-clutch control cannot be executed.

The present invention was made in view of the background art described above. It is therefore an object of the present invention to provide a control apparatus for a drive-force transmitting apparatus that is to be provided in a vehicle, wherein the drive-force transmitting apparatus defines a plurality of drive-force transmitting paths provided between an input shaft and an output shaft of the drive-force transmitting apparatus, and includes engagement devices configured to connect and disconnect the drive-force transmitting paths, and wherein the control apparatus is capable of reducing a shock generated in a switching transition from one of the drive-force transmitting paths to another of the drive-force transmitting paths, even where a hydraulic pressure applied to at least one of the engagement devices is controlled by using an on-off solenoid valve.

The object indicated above is achieved according to the following aspects of the present invention.

According to a first aspect of the invention, there is provided a control apparatus for a drive-force transmitting apparatus that is to be provided in a vehicle, wherein the drive-force transmitting apparatus includes an input shaft, an output shaft and first, second and third engagement devices, and defines a plurality of drive-force transmitting paths that are provided between the input shaft and the output shaft, wherein the plurality of drive-force transmitting paths include a first drive-force transmitting path and a second drive-force transmitting path that provides a second gear ratio lower than a first gear ratio provided in the first drive-force transmitting path, such that the first drive-force transmitting path is provided with the first and third engagement devices, and such that the third engagement device is located between the first engagement device and the output shaft in the first drive-force transmitting path, wherein the first drive-force transmitting path is established by engagement of the first engagement device operated by a hydraulic pressure which is applied to the first engagement device and which is controlled by an on-off solenoid valve (that is a simple solenoid valve that is to be placed in either one of an open position and a closed position, without an operation position intermediate between the open and closed positions), such that a drive force is to be transmitted along the first drive-force transmitting path through the first and third engagement devices when the first drive-force transmitting path is established, wherein the second drive-force transmitting path is established by engagement of the second engagement device operated by a hydraulic pressure which is applied to the second engagement device and which is controlled by a linear solenoid valve, such that the drive force is to be transmitted along the second drive-force transmitting path through the second engagement device when the second drive-force transmitting path is established, wherein the third engagement device is configured to transmit the drive force during a driving state of the vehicle and to cut off transmission of the drive force during a driven state of the vehicle, and wherein the control apparatus comprises a transmission-shifting control portion configured, in a case in which the second drive-force transmitting path is to be established in place of the first drive-force transmitting path during running of the vehicle, to cause the second engagement device to be engaged when the first engagement device is engaged, and to cause the first engagement device to be released after an inertia phase is started. It is noted that the feature regarding to the third engagement device (which is described that the third engagement device is configured to transmit the drive force during a driving state of the vehicle and to cut off transmission of the drive force during a driven state of the vehicle) may be described alternatively that the third engagement device includes an input-side rotary portion and an output-side rotary portion such that rotation is to be transmitted between the input shaft and the input-side rotary portion along the first drive-force transmitting path and such that rotation is to be transmitted between the output-side rotary portion and the output shaft along the first drive-force transmitting path, wherein the input-side rotary portion is inhibited from being rotated in a predetermined one of opposite directions relative to the output-side rotary portion and is allowed to be rotated in the other of the opposite directions relative to the output-side rotary portion. Further, for example, the input-side rotary portion of the third engagement device is connected to a first rotary element and is to be rotated integrally with the first rotary element, wherein the output-side rotary portion of the third engagement device is connected to a second rotary element and is to be rotated integrally with the second rotary element, and wherein, when the first and second engagement devices are both engaged and the input shaft is rotated, the first and second rotary elements are both rotated such that a rotational speed of the second rotary element is higher than a rotational speed of the first rotary element, whereby the input-side rotary portion of the third engagement device is rotated in the other of the opposite directions relative to the output-side rotary portion of the third engagement device. It is further noted that the above-described expression that "after an inertia phase is started" may be replaced by an expression that "after a rotational speed of the input shaft of the drive-force transmitting apparatus starts to be changed by engagement of the second engagement device".

According to a second aspect of the invention, in the control apparatus according to the first aspect of the invention, there is provided a learning control portion which is configured to execute learning of a command pressure value of the hydraulic pressure applied to the second engagement device during a given length of time from start of the inertia phase, and to cause the first engagement device to wait to be released, without causing the first engagement device to be released, during the given length of time from the start of the inertia phase. For example, the learning control portion is configured to obtain an actual rate of change of a rotational speed of the input shaft which is caused by engagement of the second engagement device, and to correct the command pressure value of the hydraulic pressure or a value related to the command pressure value of the hydraulic pressure, depending on a difference between the obtained actual rate and a target rate of the change of the rotational speed of the input shaft.

According to a third aspect of the invention, in the control apparatus according to the first or second aspect of the invention, the first and second drive-force transmitting paths are provided in parallel with each other, wherein the drive-force transmitting apparatus further includes a continuously variable transmission that is provided in the second drive-force transmitting path.

According to a fourth aspect of the invention, in the control apparatus according to any one of the first through third aspects of the invention, the third engagement device is to be placed in a selected one of a one-way mode and a lock mode, such that the third engagement device is configured to transmit the drive force during the driving state of the vehicle and to cut off transmission of the drive force during the driven state of the vehicle when the third engagement device is placed in the one-way mode, and such that the third engagement device is configured to transmit the drive force during the driving state of the vehicle and during the driven state of the vehicle when the third engagement device is placed in the lock mode.

In the control apparatus according to the first aspect of the invention, in the case in which the second drive-force transmitting path is to be established in place of the first drive-force transmitting path during running of the vehicle, the second engagement device is caused to start to be engaged when the first engagement device is still in its engaged state. Then, when all torque becomes transmittable along the second drive-force transmitting path with increase of a torque capacity of the second engagement device, the first drive-force transmitting path is disconnected by the third engagement device whereby the drive-force transmitting path along which the torque is transmitted is switched from the first drive-force transmitting path to the second drive-force transmitting path. Thus, transfer of the torque between the first and second drive-force transmitting paths is made appropriately through the third engagement device, so that it is possible to minimize or reduce a shock generated in process of the transfer of the torque between the first and second drive-force transmitting paths. Further, when the drive-force transmitting path along which the torque is transmitted has been switched to the second drive-force transmitting path, the inertia phase is started. With the first engagement device being released after the inertia phase is started, namely, with the first engagement device being switched from its engaged state to its released state while the first drive-force transmitting path is being disconnected by the third engagement device, it is possible to avoid generation of a shock by the release of the first engagement device, even if the hydraulic pressure applied to the first engagement device is not finely controlled by the on-off solenoid valve. Thus, although the hydraulic pressure applied to the first engagement device is controlled by the on-off solenoid valve, it is possible to reduce a shock generated in the switching transition from the first drive-force transmitting path to the second drive-force transmitting path. Moreover, since the hydraulic pressure applied to the first engagement device is controlled by the on-off solenoid valve, the manufacturing cost can be made lower than in an arrangement in which the hydraulic pressure applied to the first engagement device is controlled by a linear solenoid valve.

In the control apparatus according to the second aspect of the invention, during the given length of time from the start of the inertia phase, the learning of the command pressure value of the hydraulic pressure applied to the second engagement device is executed while the first engagement device is caused to wait to be released without the first engagement device being caused to be released. Thus, the learning of the command pressure value of the hydraulic pressure applied to the second engagement device is avoided from being executed concurrently with release of the first engagement device.

In the control apparatus according to the third aspect of the invention, after the drive-force transmitting path has been switched from the first drive-force transmitting path to the second drive-force transmitting path during running of the vehicle, the vehicle is enabled to run with execution of shifting actions in the continuously variable transmission that is provided in the second drive-force transmitting path.

In the control apparatus according to the fourth aspect of the invention, the third engagement device is to be placed in a selected one of the one-way mode and the lock mode. Therefore, for example, when the vehicle is caused to run by an inertia with the first drive-force transmitting path being established to be placed in a drive-force transmittable state, the third engagement device is placed in the lock mode, thereby enabling an engine brake to be generated by drag of a drive force source that is caused by rotation of drive wheels transmitted to the drive force source through the third engagement device that is placed in the lock mode.

BRIEF DESCRIPTION OF THE DRAWINGS

FIG. 4 is a table indicating an operation state of each of engagement devices for each of operation positions which is selected by operation of a manually-operated shifting device in the form of a shift lever that is provided in the vehicle;

FIG. 6 is a flow chart for explaining a control routine that is executed when a second drive-force transmitting path is to be established in place of a first drive-force transmitting path, namely, when a shift-up action from a first speed position to a second speed position is executed during running of the vehicle with a shift lever of the vehicle being placed in a drive position D; and FIG. 7 is a time chart showing a result of the control routine executed as shown in the flow chart of FIG. 6.

DETAILED DESCRIPTION OF PREFERRED EMBODIMENT

In the description of the present specification, the expression that "switching from one of the drive-force transmitting paths to another of the drive-force transmitting paths" or "establishing one of the drive-force transmitting paths in place of another of the drive-force transmitting paths" means "changing a drive-force transmitting path along which the drive force is to be transmitted during running of the vehicle". For example, the expression that "switching from a first drive-force transmitting path to a second drive-force transmitting path" or "establishing a second drive-force transmitting path in place of a first drive-force transmitting path" means "changing from a first state in which the drive force is transmitted along the first drive-force transmitting path, to a second state in which the drive force is transmitted along the second drive-force transmitting path", and practically, means "releasing at least one engagement device provided in the first drive-force transmitting path while engaging at least one engagement device provided in the second drive-force transmitting path".

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

EMBODIMENT

Figure 1:
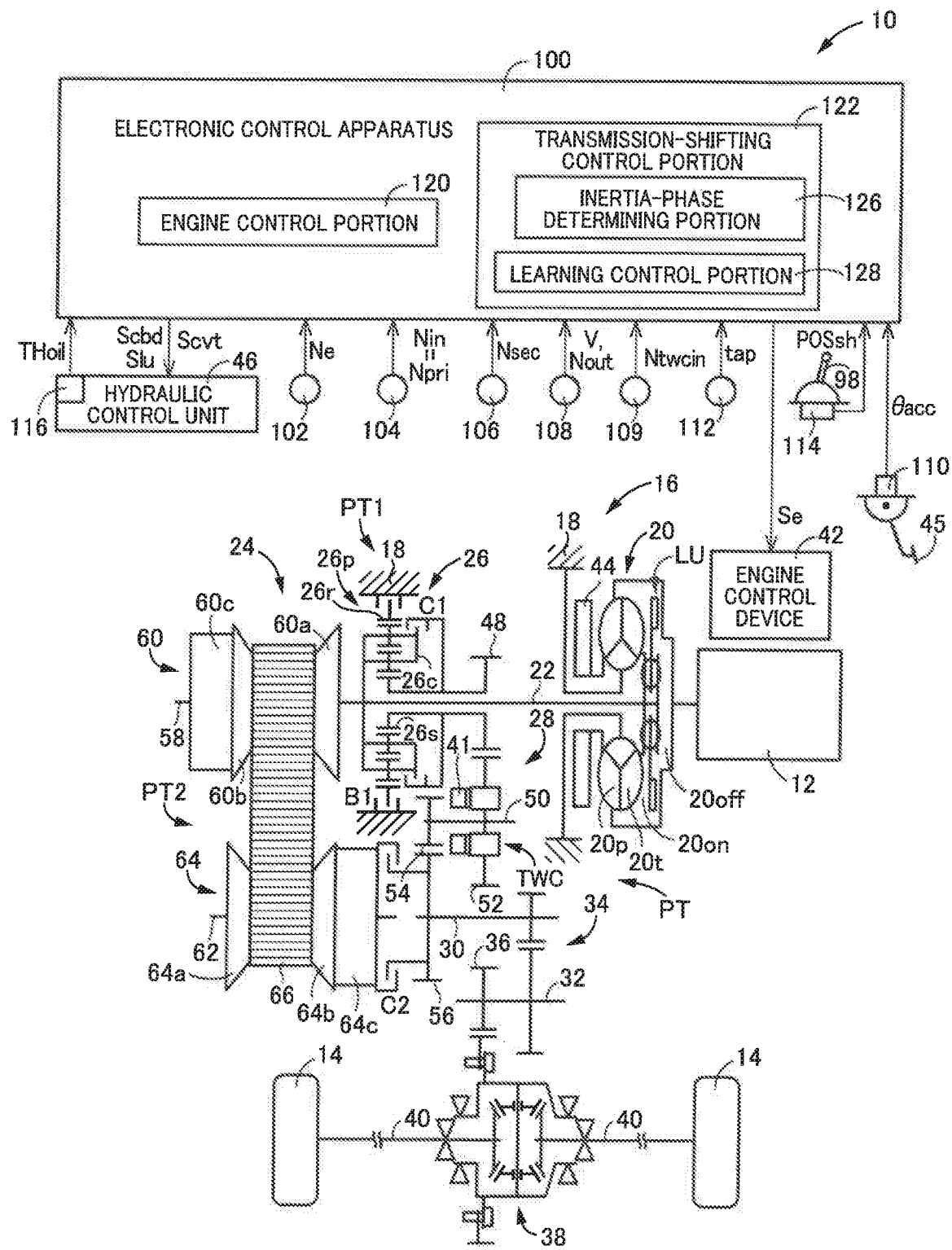
FIG. 1 is a schematic view showing a construction of a vehicle to be controlled by an electronic control apparatus according to the present invention, and major control functions and control portions of the control apparatus.

FIG. 1 is a schematic view showing a construction of a vehicle 10 to be controlled by a control apparatus according to the present invention. As shown in FIG. 1, the vehicle 10 is provided with an engine 12 functioning as a drive force source configured to generate a drive force, drive wheels 14 and a vehicle drive-force transmitting apparatus 16 that is configured to transmit the drive force of the engine 12 to the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a belt-type continuously variable transmission 24 connected to the input shaft 22, a forward/reverse switching device 26 connected to the input shaft 22, a gear mechanism 28 which is provided in parallel with the continuously variable transmission 24 and which is connected to the input shaft 22 via the forward/reverse switching device 26, an output shaft 30 serving as an output rotary member that is common to the continuously variable transmission 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, a differential gear device 38 connected to the gear 36 in a drive-force transmittable manner, and right and left axles 40 that connect the differential gear device 38 to the respective right and left drive wheels 14. The torque converter 20, input shaft 22, continuously variable transmission 24, forward/reverse switching device 26, gear mechanism 28, output shaft 30, counter shaft 32, reduction gear device 34, gear 36 and differential gear device 38 are disposed within the casing 18.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously variable transmission 24, reduction gear device 34, differential gear device 38, axles 40 and other elements. It is noted that the above-described drive force is synonymous with a drive torque or a drive power unless otherwise distinguished from them.

The drive-force transmitting apparatus 16 defines a first drive-force transmitting path PT1 and a second drive-force transmitting path PT2 that are provided in parallel with each other between the input shaft 22 and the output shaft 30, such that the drive force of the engine 12 is to be transmitted along a selected one of the first and second drive-force transmitting paths PT1, PT2 from the input shaft 22 to the output shaft 30. The first drive-force transmitting path PT1 is provided with the gear mechanism 28 while the second drive-force transmitting path PT2 is provided with the continuously variable transmission 24. Thus, the drive-force transmitting apparatus 16 has a plurality of drive-force transmitting paths in the form of the first and second drive-force transmitting paths PT1, PT2, which are provided in parallel with each other between the input shaft 22 and the output shaft 30.

The first drive-force transmitting path PT1 is provided with: the forward/reverse switching device 26 including a first clutch C1 and a first brake B1; the gear mechanism 28; and a two-way clutch TWC serving as a third engagement device, and is a drive-force transmitting path along which the drive force of the engine 12 is to be transmitted from the input shaft 22 to the drive wheels 14 through the gear mechanism 28. In the first drive-force transmitting path PT1, the forward/reverse switching device 26, gear mechanism 28 and two-way clutch TWC are arranged in this order of description in a direction away from the engine 12 toward the drive wheels 14, so that the two-way clutch TWC is provided between the first clutch C1 (that is included in the forward/reverse switching device 26) the output shaft 30 in the first drive-force transmitting path PT1. It is noted that the two-way clutch TWC corresponds to "third engagement device" recited in the appended claims.

The second drive-force transmitting path PT2 is provided with the continuously variable transmission 24 and a second clutch C2, and is a drive-force transmitting path along which the drive force of the engine 12 is to be transmitted from the input shaft 22 to the drive wheels 14 through the continuously variable transmission 24. In the second drive-force transmitting path PT2, the continuously variable transmission 24 and second clutch C2 are arranged in this order of description in a direction away from the engine 12 toward the drive wheels 14.

The continuously variable transmission 24, which is provided in the second drive-force transmitting path PT2, includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously variable transmission 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14.

The gear mechanism 28, which is provided in the first drive-force transmitting path PT1, provides a gear ratio EL (=input-shaft rotational speed Nin/output-shaft rotational speed Nout) that is higher than a highest gear ratio in the second drive-force transmitting path PT2 which corresponds to a highest gear ratio $\gamma$max of the continuously variable transmission 24. That is, the gear ratio EL of the gear mechanism 28, which may be interpreted also as a gear ratio in the first drive-force transmitting path PT1, is set to be a gear ratio that provides a lower speed than the highest gear ratio $\gamma$max, so that a gear ratio (second gear ratio) established in the second drive-force transmitting path PT2 provides a higher speed than the gear ratio EL (first gear ratio) established in the first drive-force transmitting path PT1. It is noted that the input-shaft rotational speed Nin is a rotational speed of the input shaft 22 and that the output-shaft rotational speed Nout is a rotational speed of the output shaft 30.

In the drive-force transmitting apparatus 16, one of the first and second drive-force transmitting paths PT1, PT2, which is selected depending on a running state of the vehicle 10, is established, and the drive force of the engine 12 is transmitted to the drive wheels 14 along the established one of the first and second drive-force transmitting paths PT1, PT2. Therefore, the drive-force transmitting apparatus 16 includes a plurality of engagement devices for selectively establishing the first and second drive-force transmitting paths PT1, PT2. The plurality of engagement devices include the above-described first clutch C1, first brake B1, second clutch C2 and two-way clutch TWC.

The first clutch C1, which is provided in the first drive-force transmitting path PT1, is an engagement device which is configured to selectively connect and disconnect the first drive-force transmitting path PT1, and which is configured, when the vehicle 10 is to run in forward direction, to enable the drive force to be transmitted along the first drive-force transmitting path PT1, by being engaged. The first brake B1, which is also provided in the first drive-force transmitting path PT1, is an engagement device which is configured to selectively connect and disconnect the first drive-force transmitting path PT1, and which is configured, when the vehicle 10 is to run in reverse direction, to enable the drive force to be transmitted along the first drive-force transmitting path PT1 by being engaged. The first drive-force transmitting path PT1 is established by engagement of either the first clutch C1 or the first brake B1. It is noted that the first clutch C1 corresponds to "first engagement device" recited in the appended claims.

The second clutch C2, which is provided in the second drive-force transmitting path PT2, is an engagement device which is configured to selectively connect and disconnect the second drive-force transmitting path PT2, and which is configured, when the vehicle 10 is to run in forward direction, to enable the drive force to be transmitted along the second drive-force transmitting path PT2, by being engaged. It is noted that the second clutch C2 corresponds to "second engagement device" recited in the appended claims.

Each of the first clutch C1, first brake B1 and second clutch C2 is a known hydraulically-operated wet-type frictional engagement device that is to be frictionally engaged by operation of a hydraulic actuator. Each of the first clutch C1 and first brake B1 constitutes a part of the forward/reverse switching device 26.

The two-way clutch TWC, which is also provided in the first drive-force transmitting path PT1, is to be placed in a selected one of a one-way mode and a lock mode, such that the two-way clutch TWC is configured to transmit the drive force during a driving state of the vehicle 10 in the forward running and to cut off transmission of the drive force during a driven state of the vehicle 10 in the forward running when the two-way clutch TWC is placed in the one-way mode, and such that the two-way clutch TWC is configured to transmit the drive force during the driving state of the vehicle 10 and during the driven state of the vehicle 10 when the two-way clutch TWC is placed in the lock mode. For example, with the first clutch C1 being placed in the engaged state and with the two-way clutch TWC being placed in the one-way mode, the drive force is transmittable along the first drive-force transmitting path PT1 during the driving state of the vehicle 10 during which the vehicle 10 runs in forward direction by the drive force of the engine 12. That is, during the forward running of the vehicle 10, the drive force of the engine 12 is transmitted to the drive wheels 14 along the first drive-force transmitting path PT1. On the other hand, during the driven state of the vehicle 10, for example, during an inertia running of the vehicle 10 in forward direction, rotation transmitted from the drive wheels 14 is blocked by the of the two-way clutch TWC even when the first clutch C1 is in the engaged state. It is noted that the driving state of the vehicle 10 is a state in which a torque applied to the input shaft 22 takes a positive value so as to act on the input shaft 22 in a direction corresponding to a direction of the running of the vehicle 10, namely, practically, a state in which the vehicle 10 is driven by the drive force of the engine 12. It is further noted that the driven state of the vehicle 10 is a state in which a torque applied to the input shaft 22 takes a negative value so as to act on the input shaft 22 in a direction opposite to a direction of the running of the vehicle 10, namely, practically, a state in which the vehicle 10 is caused to run by an inertia with the engine 12 being dragged by rotation transmitted from the drive wheels 14.

Further, in a state in which the two-way clutch TWC is in the lock mode with the first clutch C1 being in the engaged state, the drive force is enabled to be transmitted through the two-way clutch TWC during the driven state of the vehicle 10 as well as during the driving state of the vehicle 10. In this state, the drive force of the engine 12 is transmitted to the drive wheels 14 along the first drive-force transmitting path PT1, and, during the driven state of the vehicle 10 such as the inertia running, the rotation transmitted from the drive wheels 14 is transmitted to engine 12 along the first drive-force transmitting path PT1 whereby the engine 12 is dragged to generate an engine brake. Further, in a state in which the two-way clutch TWC is in the lock mode with the first brake B1 being in the engaged state, the drive force of the engine 12 is transmitted to the drive wheels 14 through the two-way clutch TWC along the first drive-force transmitting path PT1 and acts on the drive wheels 14 so as to force the drive wheels 14 to be rotated in a direction that causes the vehicle 10 to run in reverse direction. Thus, in this state, the vehicle 10 is enabled to run in the reverse direction with the drive force transmitted along the transmitting path PT1 to the drive wheels 14. The construction of the two-way clutch TWC will be described later.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 100 (that corresponds to "control apparatus" recited in the appended claims), based on an operation amount θacc of an accelerator pedal 45 that corresponds to a required drive force of the vehicle 10 required by an operator of the vehicle 10, whereby an engine torque Te as an output torque of the engine 12 is controlled.

The torque converter 20 is provided between the engine 12 and the continuously variable transmission 24, and includes a pump impeller 20p and a turbine impeller 20t, such that the pump impeller 20p is connected to the engine 12 while the turbine impeller 20t is connected to the input shaft 22. The torque converter 20 is a fluid-operated type drive-force transmitting device configured to transmit the drive force of the engine 12 to the input shaft 22. The torque converter 20 is provided with a known lock-up clutch LU disposed between the pump impeller 20p and the turbine impeller 20t that serve as an input rotary member and an output rotary member of the torque converter 20, respectively, so that the pump impeller 20p and the turbine impeller 20t, namely, the engine 12 and the input shaft 22, can be directly connected to each other through the lock-up clutch LU, depending on the running state of the vehicle 10. The engine 12 and the input shaft 22 are directly connected to each other through the lock-up clutch LU, for example, when the vehicle 10 runs at a speed within a relatively high speed range.

The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 (see FIG. 5) that is provided in the vehicle 10, for performing a shifting control operation in the continuously-variable transmission 24, generating a belt clamping force in the continuously-variable transmission 24, switching the operation state of the lock-up clutch LU and switching the operation state of each of the above-described engagement devices between its engaged state and released state, or between its one-way mode and lock mode.

The forward/reverse switching device 26 includes a planetary gear device 26p of double-pinion type in addition to the first clutch C1 and the first brake B. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B. The sun gear 26s is disposed radially outside the input shaft 22, and is connected to a small-diameter gear 48 that is rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is mounted on the counter shaft 50, rotatably relative to the counter shaft 50. The gear mechanism 28 further includes a counter gear 54 and an output gear 56. The counter gear 54 is mounted on the counter shaft 50, unrotatably relative to the counter shaft 50, and meshes with the output gear 56 that is mounted on the output shaft 30. It is noted that the large-diameter gear 52 and the counter gear 54 correspond to "first and second rotary elements", respectively, which are recited in the appended claims.

The two-way clutch TWC is provided between the large-diameter gear 52 and the counter gear 54 in an axial direction of the counter shaft 50, such that the two-way clutch TWC is located to be closer, than the first clutch C1 and the gear mechanism 28, to the drive wheels 14 in the first drive-force transmitting path PT1. That is, the two-way clutch TWC is located between the first clutch C1 (and the gear mechanism 28) and the output shaft 30 in the first drive-force transmitting path PT1. The two-way clutch TWC is switchable between the one-way mode and the lock mode by operation of a hydraulic actuator 41 that is disposed to be adjacent to the two-way clutch TWC in the axial direction of the counter shaft 50, so as to be placed in a selected one of the one-way mode and the lock mode.

Figure 2:
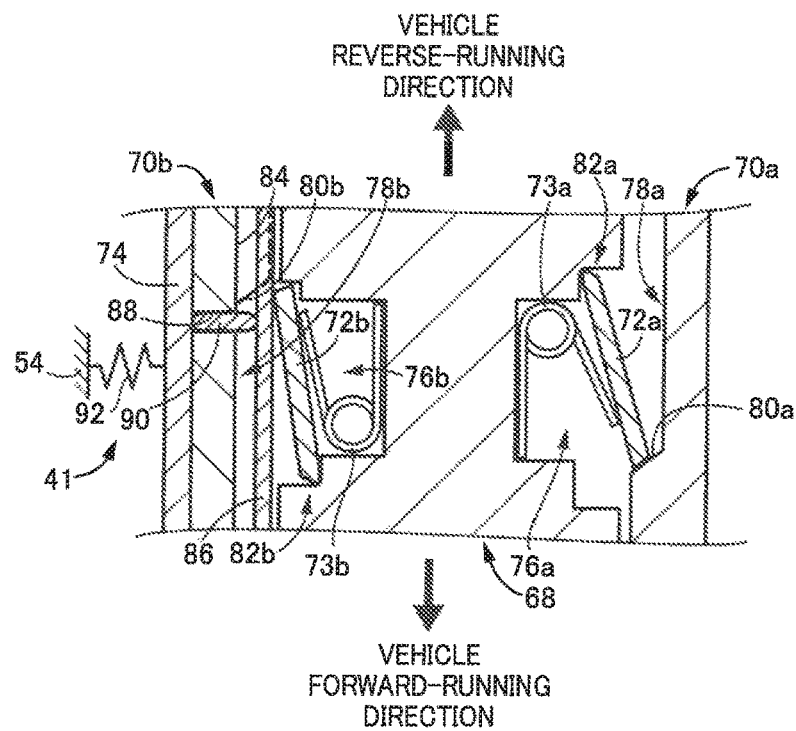
FIG. 2 is a view schematically showing a construction of a two-way clutch shown in FIG. 1, wherein the view is a cross sectional view of a circumferential portion of the two-way clutch, taken in a plane perpendicular to a radial direction of the two-way clutch, and shows the two-way clutch in its one-way mode.
Figure 3:
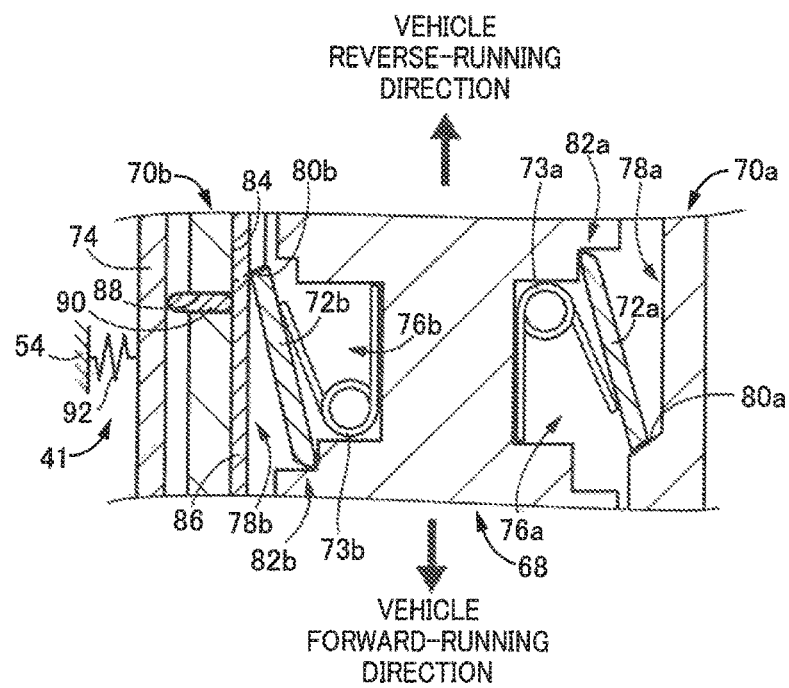
FIG. 3 is a view schematically showing the construction of the two-way clutch shown in FIG. 1, wherein the view is the cross sectional view of the circumferential portion, taken in the plane perpendicular to the radial direction of the two-way clutch, and shows the two-way clutch in its lock mode.

Each of FIGS. 2 and 3 is a view schematically showing a construction of the two-way clutch TWC, which enables switching between the one-way mode and the lock mode, wherein the view is a cross sectional view of a circumferential portion of the two-way clutch, taken in a plane perpendicular to a radial direction of the two-way clutch TWC. FIG. 2 shows a state in which the two-way clutch TWC is placed in the one-way mode. FIG. 3 shows a state in which the two-way clutch TWC is placed in the lock mode. In each of FIGS. 2 and 3, a vertical direction on the drawing sheet corresponds to a circumferential direction of the two-way clutch TWC, an upward direction on the drawing sheet corresponds to a vehicle reverse-running direction (i.e., direction of rotation for reverse running of the vehicle 10) and a downward direction on the drawing sheet corresponds to a vehicle forward-running direction (i.e., direction of rotation for forward running of the vehicle 10). Further, in each of FIGS. 2 and 3, a horizontal direction on the drawing sheet corresponds to the axial direction of the counter shaft 50 (hereinafter, the term "axial direction" means the axial direction of the counter shaft 50 unless otherwise specified), a rightward direction on the drawing sheet corresponds to a direction toward the large-diameter gear 52 shown in FIG. 1, and a leftward direction on the drawing sheet corresponds to a direction toward the counter gear 54 shown in FIG. 1.

The two-way clutch TWC has generally a disk shape, and is disposed radially outside the counter shaft 50. The two-way clutch TWC includes an input-side rotary member 68, first and second output-side rotary members 70a, 70b that are disposed to be adjacent to the input-side rotary member 68 so as to be located on respective opposite sides of the input-side rotary member 68 in the axial direction, a plurality of first struts 72*a* and a plurality of torsion coil springs 73*a* that are interposed between the input-side rotary member 68 and the first output-side rotary member 70*a* in the axial direction, and a plurality of second struts 72*b* and a plurality of torsion coil springs 73*b* that are interposed between the input-side rotary member 68 and the second output-side rotary member 70*b* in the axial direction. It is noted that the input-side rotary member 68 constitutes "input-side rotary portion (of the two-way clutch)" recited in the appended claims, and that the first and second output-side rotary members 70*a*, 70*b* cooperate with each other to constitute "output-side rotary portion (of the two-way clutch)" recited in the appended claims.

The input-side rotary member 68 has generally a disk shape, and is rotatable relative to the counter shaft 50 about an axis of the counter shaft 50. The input-side rotary member 68 is located between the first and second output-side rotary members 70*a*, 70*b* (hereinafter referred to as output-side rotary members 70 when they are not to be particularly distinguished from each other) in the axial direction. The input-side rotary member 68 is formed integrally with the large-diameter gear 52, such that teeth of the larger-diameter gear 52 are located radially outside the input-side rotary member 68. The input-side rotary member 68 is connected to the engine 12, in a drive-force transmittable manner, through the gear mechanism 28 and the forward/reverse switching device 26, for example.

The input-side rotary member 68 has, in its axial end surface that is opposed to the first output-side rotary member 70*a* in the axial direction, a plurality of first receiving portions 76*a* in which the first struts 72*a* and the torsion coil springs 73*a* are received. The first receiving portions 76*a* are equi-angularly spaced apart from each other in a circumferential direction of the input-side rotary member 68. Further, the input-side rotary member 68 has, in another axial end surface thereof that is opposed to the second output-side rotary member 70*b* in the axial direction, a plurality of second receiving portions 76*b* in which the second struts 72*b* and the torsion coil springs 73*b* are received. The second receiving portions 76*b* are equi-angularly spaced apart from each other in the circumferential direction of the input-side rotary member 68. The first and second receiving portions 76*a* are substantially aligned in a radial direction of the input-side rotary member 68.

The first output-side rotary member 70*a* has generally a disk-shaped, and is rotatable about the axis of the counter shaft 50. The first output-side rotary member 70*a* is unrotatable relative to the counter shaft 50, so as to be rotated integrally with the counter shaft 50. The first output-side rotary member 70*a* is connected to the drive wheels 14, in a drive-force transmittable manner, through the counter shaft 50, counter gear 54 output shaft 30 and differential gear device 38, for example.

The first output-side rotary member 70*a* has, in its surface that is opposed to the input-side rotary member 68 in the axial direction, a plurality of first recessed portions 78*a* each of which is recessed in a direction away from the input-side rotary member 68. The first recessed portions 78*a*, whose number is the same as the first receiving portions 76*a*, are equi-angularly spaced apart from each other in the circumferential direction. The first recessed portions 78*a* are substantially aligned with the first receiving portions 76*a* provided in the input-side rotary member 68, in a radial direction of the first output-side rotary member 70*a*. Therefore, when each of the first receiving portions 76*a* is aligned with one of the first recessed portions 78*a* in the circumferential direction, namely, when a rotational position of each of the first receiving portions 76*a* coincides with that of one of the first recessed portions 78*a*, the first receiving portion 76*a* and the first recessed portion 78*a* are opposed to and adjacent with each other in the axial direction. Each of the first recessed portions 78*a* has a shape by which a longitudinal end portion of any one of the first struts 72*a* can be received in the first recessed portion 78*a*. Further, each of the first recessed portions 78*a* has, in its circumferential end, a first wall surface 80*a* with which the longitudinal end portion of one of the first struts 72*a* is to be in contact, when the input-side rotary member 68 is rotated in the above-described vehicle forward-running direction (corresponding to the downward direction on the drawing sheet of each of FIGS. 2 and 3) relative to the output-side rotary members 70, by the drive force of the engine 12.

The second output-side rotary member 70*b* has generally a disk-shaped, and is rotatable about the axis of the counter shaft 50. The second output-side rotary member 70*b* is unrotatable relative to the counter shaft 50, so as to be rotated integrally with the counter shaft 50. The second output-side rotary member 70*b* is connected to the drive wheels 14, in a drive-force transmittable manner, through the counter shaft 50, counter gear 54, output shaft 30 and differential gear device 38, for example.

The second output-side rotary member 70*b* has, in its surface that is opposed to the input-side rotary member 68 in the axial direction, a plurality of second recessed portions 78*b* each of which is recessed in a direction away from the input-side rotary member 68. The second recessed portions 78*b*, whose number is the same as the second receiving portions 76*b*, are equi-angularly spaced apart from each other in the circumferential direction. The second recessed portions 78*b* are substantially aligned with the second receiving portions 76*b* provided in the input-side rotary member 68, in a radial direction of the second output-side rotary member 70*b*. Therefore, when each of the second receiving portions 76*b* is aligned with one of the second recessed portions 78*b* in the circumferential direction, namely, when a rotational position of each of the second receiving portions 76*b* coincides with that of one of the second recessed portions 78*b*, the second receiving portion 76*b* and the second recessed portion 78*b* are opposed to and adjacent with each other in the axial direction. Each of the second recessed portions 78*b* has a shape by which a longitudinal end portion of any one of the second struts 72*b* can be received in the second recessed portion 78*b*. Further, each of the second recessed portions 78*b* has, in its circumferential end, a second wall surface 80*b* with which the longitudinal end portion of one of the second struts 72*b* is to be in contact, when the input-side rotary member 68 is rotated in the above-described vehicle reverse-running direction (corresponding to the upward direction on the drawing sheet of each of FIGS. 2 and 3) relative to the output-side rotary members 70, by the drive force of the engine 12 with the two-way clutch TWC being placed in the lock mode, or when the vehicle 10 is in an inertia running state during the forward running with the two-way clutch TWC being placed in the lock mode.

Each of the first struts 72*a* is constituted by a plate-like member having a predetermined thickness, and is elongated in the circumferential direction (corresponding to the vertical direction on the drawing sheet), as shown in the cross sectional views of FIGS. 2 and 3. Further, each of the first struts 72a has a predetermined dimension as measured in a direction perpendicular to the drawing sheet of FIGS. 2 and 3.

The longitudinal end portion of each of the first struts 72a is constantly forced or biased, by a corresponding one of the torsion coil springs 73a, toward the first output-side rotary member 70a. Further, each of the first struts 72a is in contact at another longitudinal end portion thereof with a first stepped portion 82a provided in a corresponding one of the first receiving portions 76a, such that the first strut 72a is pivotable about the other longitudinal end portion thereof that is in contact with the first stepped portion 82a. Each of the torsion coil springs 73a is interposed between a corresponding one of the first struts 72a and the input-side rotary member 68, and constantly forces or biases the longitudinal end portion of the corresponding one of the first struts 72a toward the first output-side rotary member 70a.

Owing to the above-described construction, in a state in which the two-way clutch TWC is placed in either the one-way mode or the lock mode, when the input-side rotary member 68 receives the drive force which is transmitted from the engine 12 and which acts in the vehicle forward-running direction, each of the first struts 72a is in contact at the longitudinal end portion with the first wall surface 80a of the first output-side rotary member 70a and is in contact at the other longitudinal end portion with the first stepped portion 82a of the input-side rotary member 68, so that the input-side rotary member 68 and the first output-side rotary member 70a are inhibited from being rotated relative to each other whereby the drive force acting in the vehicle forward-running direction is transmitted to the drive wheels 14 through the two-way clutch TWC. The above-described first struts 72a, torsion coil springs 73a, first receiving portions 76a and first recessed portions 78a (each defining the first wall surface 80a) cooperate to constitute a one-way clutch that is configured to transmit the drive force during the driving state in the forward running of the vehicle 10, and to cut off transmission of the drive force during the driven state in the forward running of the vehicle 10. The one-way clutch practically constitutes the "third engagement device" recited in the appended claims.

Each of the second struts 72b is constituted by a plate-like member having a predetermined thickness, and is elongated in the circumferential direction (corresponding to the vertical direction on the drawing sheet), as shown in the cross sectional views of FIGS. 2 and 3. Further, each of the second struts 72b has a predetermined dimension as measured in a direction perpendicular to the drawing sheet of FIGS. 2 and 3.

The longitudinal end portion of each of the second struts 72b is constantly forced or biased, by a corresponding one of the torsion coil springs 73b, toward the second output-side rotary member 70b. Further, each of the second struts 72b is in contact at another longitudinal end portion thereof with a second stepped portion 82b provided in one of the second receiving portions 76b, such that the second strut 72b is pivotable about the other longitudinal end portion thereof that is in contact with the second stepped portion 82b. Each of the torsion coil springs 73b is interposed between a corresponding one of the second struts 72b and the input-side rotary member 68, and constantly forces or biases the longitudinal end portion of the corresponding one of the second struts 72b toward the second output-side rotary member 70b.

Owing to the above-described construction, in a state in which the two-way clutch TWC is placed in the lock mode, when the input-side rotary member 68 receives the drive force which is transmitted from the engine 12 and which acts in the vehicle reverse-running direction, each of the second struts 72b is in contact at the longitudinal end portion with the second wall surface 80b of the second output-side rotary member 70b and is in contact at the other longitudinal end portion with the second stepped portion 82b of the input-side rotary member 68, so that the input-side rotary member 68 and the second output-side rotary member 70b are inhibited from being rotated relative to each other whereby the drive force acting in the vehicle reverse-running direction is transmitted to the drive wheels 14 through the two-way clutch TWC. Further, in the state in which the two-way clutch TWC is placed in the lock mode, when the inertia running is made during running of the vehicle 10 in the forward direction, too, each of the second struts 72b is in contact at the longitudinal end portion with the second wall surface 80b of the second output-side rotary member 70b and is in contact at the other longitudinal end portion with the second stepped portion 82b of the input-side rotary member 68, so that the input-side rotary member 68 and the second output-side rotary member 70b are inhibited from being rotated relative to each other whereby the rotation transmitted from the drive wheels 14 is transmitted to the engine 12 through the two-way clutch TWC. The above-described second struts 72b, torsion coil springs 73b, second receiving portions 76b and second recessed portions 78b (each defining the second wall surface 80b) cooperate to constitute a one-way clutch that is configured to transmit the drive force acting in the vehicle reverse-running direction, toward the drive wheels 14, and to cut off transmission of the drive force acting in the vehicle forward-running direction, toward the drive wheels 14.

Further, the second output-side rotary member 70b has a plurality of through-holes 88 that pass through the second output-side rotary member 70b in the axial direction. Each of the through-holes 88 is located in a position that overlaps with a corresponding one of the second recessed portions 78b in the axial direction of the counter shaft 50, so that each of the through-holes 88 is in communication at its end with a corresponding one of the second recessed portions 78b. A cylindrical-shaped pin 90 is received in each of the through-holes 88, and is slidable in the through-hole 88. The pin 90 is in contact at one of its axially opposite ends with a pressing plate 74 that constitutes a part of the hydraulic actuator 41, and is in contact at the other of its axially opposite ends with an annular ring 86 that includes a plurality of portions that are located in the respective second recessed portions 78b in the circumferential direction.

The ring 86 is fitted in a plurality of arcuate-shaped grooves 84, each of which is provided in the second output-side rotary member 70b and interconnects between a corresponding adjacent pair of the second recessed portions 78b that are adjacent to each other in the circumferential direction. The ring 86 is movable relative to the second output-side rotary member 70b in the axial direction.

Like the two-way clutch TWC, the hydraulic actuator 41 is disposed on the counter shaft 50, and is located in a position adjacent to the second output-side rotary member 70b in the axial direction of the counter shaft 50. The hydraulic actuator 41 includes, in addition to the pressing plate 74, a plurality of coil springs 92 that are interposed between the counter gear 54 and the pressing plate 74 in the axial direction, and a hydraulic chamber (not shown) to which a working fluid is to be supplied whereby a thrust is generated to move the pressing plate 74 toward the counter gear 54 in the axial direction.

The pressing plate 74 has generally a disk shape, and is disposed to be movable relative to the counter shaft 50 in the axial direction. The pressing plate 74 is constantly forced or biased by the spring 92 toward the second output-side rotary member 70b in the axial direction. Therefore, in a state in which the working fluid is not supplied to the above-described hydraulic chamber of the hydraulic actuator 41, the pressing plate 74 is moved, by biasing force of the spring 92, toward the second output-side rotary member 70b in the axial direction, whereby the pressing plate 74 is in contact with the second output-side rotary member 70b, as shown in FIG. 2. In this state, the pins 90, the ring 86 and the longitudinal end portion of each of the second struts 72b are moved toward the input-side rotary member 68 in the axial direction, as shown in FIG. 2, whereby the two-way clutch TWC is placed in the one-way mode.

In a state in which the working fluid is supplied to the above-described hydraulic chamber of the hydraulic actuator 41, the pressing member 74 is moved, against the biasing force of the spring 90, toward the counter gear 54 in the axial direction, so as to be separated from the second output-side rotary member 70b. In this state, the pins 90, the ring 86 and the longitudinal end portion of each of the second struts 72b are moved, by the biasing force of the torsion coil springs 73b, toward the counter gear 54 in the axial direction, as shown in FIG. 3, whereby the two-way clutch TWC is placed in the lock mode.

In the state in which the two-way clutch TWC is placed in the one-way mode, as shown in FIG. 2, the pressing plate 74 is in contact with the second output-side rotary member 70b by the biasing force of the spring 92. In this state, the pins 90 are forced, by the pressing plate 74, to be moved toward the input-side rotary member 68 in the axial direction, and the ring 86 is forced, by the pins 90, to be moved toward the input-side rotary member 68 in the axial direction. Consequently, the longitudinal end portion of each of the second struts 72b is forced, by the ring 86, to be moved toward the input-side rotary member 68, so as to be blocked from being in contact with the second wall surface 80b, whereby the input-side rotary member 68 and the second output-side rotary member 70b are allowed to be rotated relative to each other so that the second struts 72b do not serve as a one-way clutch. Meanwhile, the longitudinal end portion of each of the first struts 72a is biased, by the corresponding coil spring 73a, toward the first output-side rotary member 70a, whereby the longitudinal end portion of each of the first struts 72a can be bought into contact with the first wall surface 80a of any one of the first recessed portions 78a so that the first struts 72a serve as a one-way clutch configured to transmit the drive force acting in the vehicle forward-running direction. That is, the first struts 72a serve as the one-way clutch that is configured to transmit the drive force during the driving state in the forward running of the vehicle 10, and to cut off transmission of the drive force during the driven state in the forward running of the vehicle 10.

In the state in which the two-way clutch TWC is placed in the one-way mode, as shown in FIG. 2, the longitudinal end portion of each of the first struts 72a can be brought into contact with the first wall surface 80a of the first output-side rotary member 70a. Therefore, in the state of the one-way mode of the two-way clutch TWC, when the vehicle 10 is placed in the driving state in which the drive force acting in the vehicle forward-running direction is transmitted from the engine 12 to the two-way clutch TWC, the longitudinal end portion of each of the first struts 72a is in contact with the first wall surface 80a and the other longitudinal end portion of each of the first struts 72a is in contact with the first stepped portion 82a, so that the input-side rotary member 68 is inhibited from being rotated relative to the first output-side rotary member 70a in the vehicle forward-running direction whereby the drive force of the engine 12 is transmitted to the drive wheels 14 through the two-way clutch TWC. On the other hand, in the state of the one-way mode of the two-way clutch TWC, when the vehicle 10 is placed in the driven state by inertia running during the forward running, the input-side rotary member 68 is allowed to be rotated relative to the first output-side rotary member 70a in the vehicle reverse-running direction, without the longitudinal end portion of each of the first struts 72a being in contact with the first wall surface 80a, whereby the transmission of the drive force through the two-way clutch TWC is blocked. Thus, in the state in which the two-way clutch TWC is placed in the one-way mode, the first struts 72a serve as the one-way clutch which is configured to transmit the drive force in the driving state of the vehicle 10 in which the drive force acting in the vehicle forward-running direction is transmitted from the engine 12, and which is configured to block transmission of the drive force in the driven state of the vehicle 10 which is placed by inertia running during the forward running. In other words, the input-side rotary member 68 as the input-side rotary portion is inhibited from being rotated in the vehicle forward-running direction (as a predetermined one of opposite directions) relative to the output-side rotary members 70 as the output-side rotary portion, and is allowed to be rotated in the vehicle reverse-running direction (as the other of the opposite directions) relative to the output-side rotary members 70 as the output-side rotary portion, when the two-way clutch TWC is placed in the one-way mode.

In the state in which the two-way clutch TWC is placed in the lock mode, as shown in FIG. 3, the working fluid is supplied to the hydraulic chamber of the hydraulic actuator 41 whereby the pressing plate 74 is moved, against the spring 92, in a direction away from the second output-side rotary member 70b, and the longitudinal end portion of each second strut 72b is moved, by biasing force of the corresponding torsion coil spring 73b, toward the corresponding second recessed portion 78b of the second output-side rotary member 70b, whereby the longitudinal end portion of each second strut 72b can be brought into contact with the second wall surface 80b of the second output-side rotary member 70b. Meanwhile, each first strut 72a can be brought into contact at the longitudinal end portion with the first wall surface 80a of the first output-side rotary member 70a, as in the state of the one-way mode shown in FIG. 2.

In the state in which the two-way clutch TWC is placed in the lock mode, as shown in FIG. 3, when the drive force acting in the vehicle forward-running direction is transmitted to the input-side rotary member 68, the longitudinal end portion of each first strut 72a is brought into contact with the first wall surface 80a of the first output-side rotary member 70a, and the other longitudinal end portion of each first strut 72a is brought into contact with the first stepped portion 82a of the input-side rotary member 68, whereby the input-side rotary member 68 is inhibited from being rotated relative to the first output-side rotary member 70a in the vehicle forward-running direction. In the state of the lock mode of the two-way clutch TWC, when the drive force acting in the vehicle reverse-running direction is transmitted to the input-side rotary member 68, the longitudinal end portion of each second strut 72b is brought into contact with the second wall surface 80b of the second output-side rotary member 70b, and the other longitudinal end portion of each second strut 72*b* is brought into contact with the second stepped portion 82*b* of the input-side rotary member 68, whereby the input-side rotary member 68 is inhibited from being rotated relative to the second output-side rotary member 70*b* in the vehicle reverse-running direction. Thus, in the state of the lock mode of the two-way clutch TWC, the first struts 72*a* serve as a one-way clutch and the second struts 72*b* serve as a one-way clutch, so that the two-way clutch TWC is configured to transmit the drive force acting in the vehicle forward-running direction and the drive force acting in the vehicle reverse-running direction. In other words, the input-side rotary member 68 as the input-side rotary portion is inhibited from being rotated in both of the opposite directions relative to the output-side rotary members 70 as the output-side rotary portion, when the two-way clutch TWC is placed in the lock mode. When the vehicle 10 is to run in reverse direction, the vehicle 10 is enabled to run in reverse direction with the two-way clutch TWC being placed in the lock mode. Further, when the vehicle 10 is placed in the driven state by inertia running during the forward running, an engine brake can be generated with the two-way clutch TWC being placed in the lock mode by which the engine 12 is dragged by rotation transmitted from the drive wheels 14 to the engine 12 through the two-way clutch TWC. Thus, in the state of the lock mode of the two-way clutch TWC, the first struts 72*a* serve as a one-way clutch and the second struts 72*b* serve as a one-way clutch, so that the two-way clutch TWC is configured to transmit the drive force during the driving state and the driven state of the vehicle 10.

Figure 4:
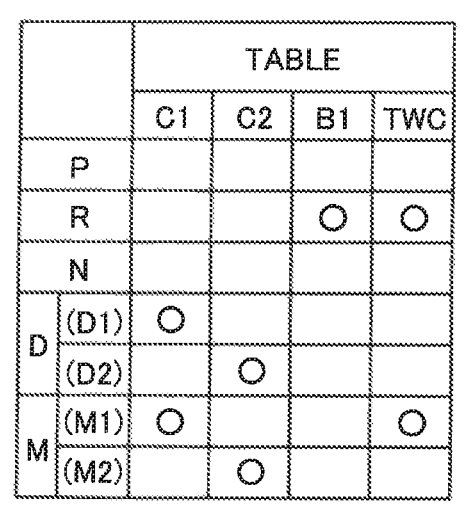

FIG. 4 is a table indicating an operation state of each of the engagement devices for each of a plurality of operation positions POSsh which is selected by operation of a manually-operated shifting device in the form of a shift lever 98 that is provided in the vehicle 10. In FIG. 4, "C1" represents the first clutch C1, "C2" represents the second clutch C2, "B1" represents the first brake B1, and "TWC" represents the two-way clutch TWC. Further, "P", "R", "N", "D" and "M" represent a a parking position P, a reverse position R, a neutral position N, a drive position D and a manual position M, respectively, as the plurality of operation positions POSsh, each of which is to be selected by operation of the shift lever 98. In the table of FIG. 4, "O" in the first clutch C1, second clutch C2 or first brake B1 indicates its engaged state, and blank in the first clutch C1, second clutch C2 or first brake B1 indicates its released state. Further, in the table of FIG. 4, "O" in the two-way clutch TWC indicates its lock mode, and blank in the two-way clutch TWC indicates its one-way mode.

For example, when the shift lever 98 is placed in the parking position P as one of the operating positions POSsh that is a vehicle stop position or in the neutral position N as one of the operating positions POSsh that is a drive-force transmission block position, the first clutch C1, second clutch C2 and first brake B1 are placed in the released positions, as indicated in FIG. 4, so that the drive-force transmitting apparatus 16 is placed in its neutral state in which the drive force is not transmitted along either the first drive-force transmitting path PT1 or the second drive-force transmitting path PT2.

When the shift lever 98 is placed in the reverse position R as one of the operating positions POSsh that is a reverse running position, the first brake B1 is placed in the engaged state and the two-way clutch TWC is placed in the lock mode, as indicated in FIG. 4. With the first brake B1 being placed in the engaged state, the drive force acting in the vehicle reverse-running direction is transmitted from the engine 12 to the gear mechanism 28. In this instance, if the two-way clutch TWC is in the one-way mode, the drive force is blocked by the two-way clutch TWC so that reverse running cannot be made. Thus, with the two-way clutch TWC being placed in the lock mode, the drive force acting in the vehicle reverse-running direction is transmitted to the output shaft 30 through the two-way clutch TWC so that reverse running can be made. When the shift lever 98 is placed in the reverse position R, the first brake B1 is placed in the engaged state and the two-way clutch TWC is placed in the lock mode, whereby a reverse gear position is established to transmit the drive force acting in the vehicle reverse-running direction, through the gear mechanism 28 along the first drive-force transmitting path PT1, to the drive wheels 14.

When the shift lever 98 is placed in the drive position D as one of the operating positions POSsh that is a forward running position, the first clutch C1 is placed in the engaged state or the second clutch C2 is placed in the engaged state, as indicated in FIG. 4. In FIG. 4, "D1" and "D2" represent a drive position D1 and a drive position D2, respectively, which are operating positions virtually set in control. When the shift lever 98 is placed in the drive position D, one of the drive position D1 and the drive position D2 is selected depending a running state of the vehicle 10, and the selected one is automatically established. The drive position D1 is established when the vehicle running speed is within a relatively low speed range including zero speed (vehicle stop). The drive position D2 is established when the vehicle running speed is within a relatively high speed range including a middle speed range. For example, during running of the vehicle 10 with the shift lever 98 being placed in the drive position D, when the running state of the vehicle 10 is changed from the low speed range to the high speed range, the drive position D1 is automatically switched to the drive position D2.

For example, when the running state of the vehicle 10 is in a speed range corresponding to the drive position D1 upon placement of the shift lever 98 into the drive position D, the first clutch C1 is engaged and the second clutch C2 is released. In this case, a forward-running gear position is established whereby the drive force acting in the vehicle forward-running direction is transmitted from the engine 12 to the drive wheels 14 along the first drive-force transmitting path PT1 through the gear mechanism 28. The two-way clutch TWC, which is placed in the one-way mode, transmits the drive force acting in the vehicle forward-running direction, toward the drive wheels 14.

Further, when the running state of the vehicle 10 is in a speed range corresponding to the drive position D2 upon placement of the shift lever 98 into the drive position D, the first clutch C1 is released and the second clutch C2 is engaged. In this case, a forward-running continuously-variable shifting position is established whereby the drive force acting in the vehicle forward-running direction is transmitted from the engine 12 to the drive wheels 14 along the second drive-force transmitting path PT2 through the continuously variable transmission 24. With the forward-running continuously-variable shifting position being established, the vehicle 10 is enabled to run with execution of shifting actions in the continuously variable transmission 24. Thus, when the shift lever 98 is placed into the drive position D as one of the operating positions POSsh, the drive force of the engine 12 is transmitted to the drive wheels 14 along a selected one of the first and second drive-force transmitting paths PT1, PT2, which is selected depending on the running state of the vehicle 10.

When the shift lever 98 is placed in the manual position M as one of the operating positions POSsh, a shift-up operation or a shift-down operation can be executed by a manual operation made by an operator of the vehicle 10. That is, the manual position M is a manual shift position in which a shifting operation can be made by the manual operation made by the operator. For example, when a shift-down operation is manually made by the operator with the shift lever 98 being placed in the manual position M, the first clutch C1 is placed into the engaged state and the two-way clutch TWC is placed into the lock mode whereby the forward-running gear position is established. With the two-way clutch TWC being placed in the lock mode, the drive force can be transmitted through the two-way clutch TWC during the driven state of the vehicle 10 as well as during the driving state of the vehicle 10. During the inertia running, for example, the vehicle 10 is placed in the driven state in which the rotation is transmitted from the drive wheels 14 toward the engine 12. In the driven state, when the shift-down operation is manually executed with the shift lever 98 being placed in the manual position M, the rotation transmitted from the drive wheels 14 is transmitted toward the engine 12 through the two-way clutch TWC that is placed in the lock mode, whereby the engine 12 is dragged to generate an engine brake. Thus, when the shift-down operation is executed with the shift lever 98 being placed in the manual position M, the forward-running gear position is established so that the drive force is transmitted to the drive wheels 14 along the first drive-force transmitting path PT1 through the gear mechanism 28, and so that the rotation transmitted from the drive wheels 14 is transmitted toward the engine 12 along the first drive-force transmitting path PT1 so as to generate the engine brake during the inertia running.

When a shift-up operation is manually made by the operator with the shift lever 98 being placed in the manual position M, the second clutch C2 is placed into the engaged state whereby the forward-running continuously-variable shifting position is established so that the drive force is transmitted to the drive wheels 14 along the second drive-force transmitting path PT2 through the continuously variable transmission 24. Thus, with the shift lever 98 being placed in the manual position M, a manual shifting can be executed by manual operation made by the operator, to select one of the forward-running gear position and the forward-running continuously-variable shifting position. When the forward-running gear position is selected, the drive force can be transmitted along the first drive-force transmitting path PT1. When the forward-running continuously-variable shifting position is selected, the drive force can be transmitted along the second drive-force transmitting path PT2. The case in which the shift-down operation has been made with the shift lever 98 being placed in the manual position M, corresponds to "M1" (position M1) that is shown in FIG. 4. The case in which the shift-up operation has been made with the shift lever 98 being placed in the manual position M, corresponds to "M2" (position M2) that is shown in FIG. 4. Although the positions M1, M2 do not exist in appearance, for the purpose of convenience in the following description, it will be described that "the position M1 is established" when the shift-down operation has been manually made with the shift lever 98 being placed in the manual position M, and it will be described that "the position M2 is established" when the shift-up operation has been manually made with the shift lever 98 being placed in the manual position M.

As indicated in the table of FIG. 4, the first clutch C1 is placed in its engaged state only when the forward-running gear position (corresponding to the drive position D1 and position M1 shown in FIG. 4) is to be establish to enable the drive force to be transmitted along the first drive-force transmitting path PT1. In other words, the first clutch C1 is not engaged when a gear position other than the forward-running gear position is to be established.

Figure 5:
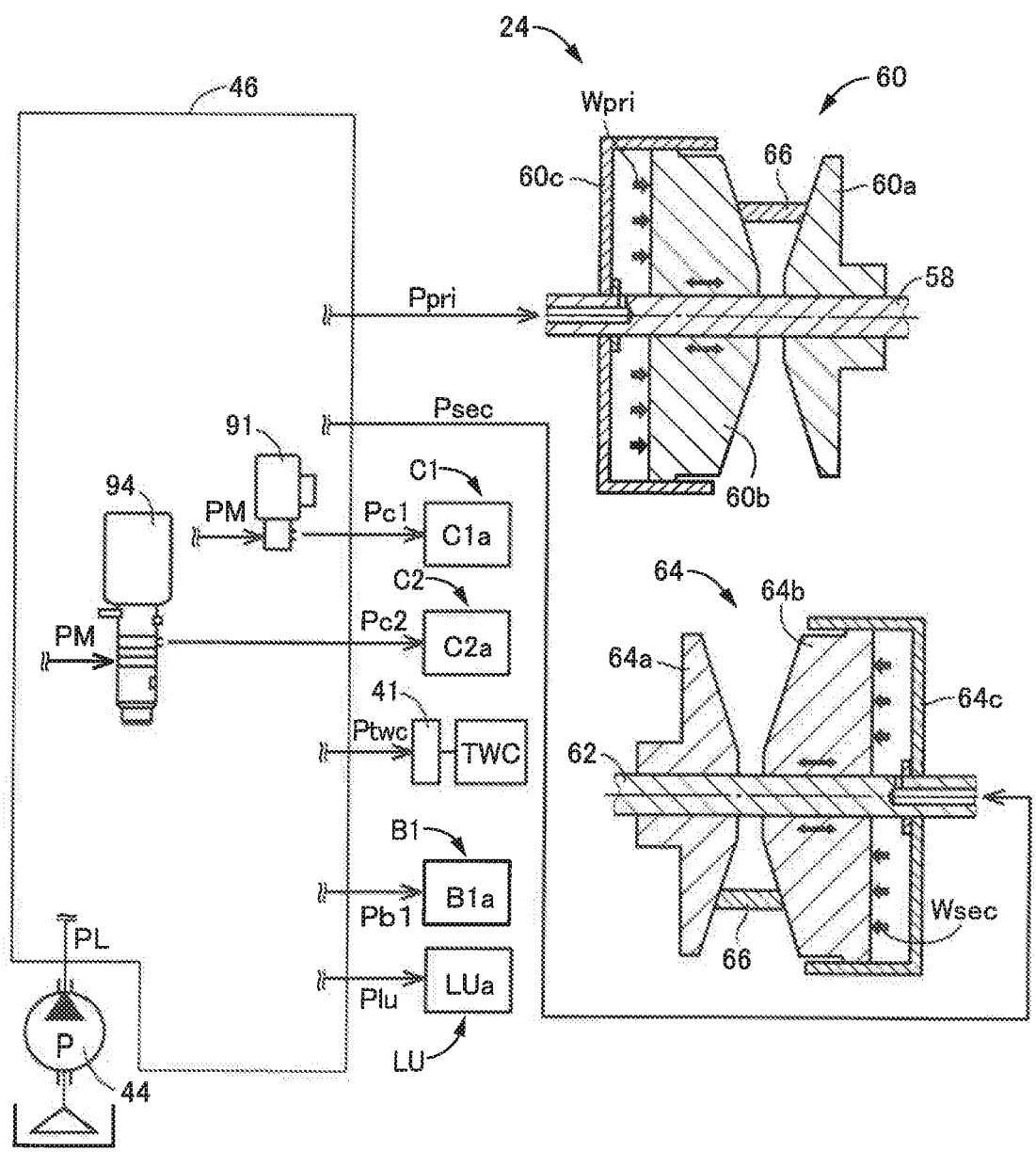
FIG. 5 is a view schematically showing a hydraulic control unit configured to control operation states of a continuously variable transmission and a drive-force transmitting apparatus shown in FIG. 1.

FIG. 5 is a view schematically showing the hydraulic control unit 46 configured to control operation states of the continuously variable transmission 24 and the drive-force transmitting apparatus 16. As shown in FIG. 5, the primary pulley 60 constituting the continuously-variable transmission 24 includes a fixed sheave 60a connected to the primary shaft 58, a movable sheave 60b unrotatable about an axis of the primary shaft 58 and axially movable relative to the fixed sheave 60a, and a primary thrust applier in the form of a hydraulic actuator 60c configured to apply a primary thrust Wpri to the movable sheave 60b. The primary thrust Wpri is a thrust (=primary pressure Ppri*pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure applied from the hydraulic control unit 46 to the hydraulic actuator 60c, and serves as a pulley hydraulic pressure for generating the primary thrust Wpri.

Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary thrust applier in the form of a secondary hydraulic actuator 64c configured to apply a secondary thrust Wsec to the movable sheave 64b. The secondary thrust Wsec is a thrust (=secondary pressure Psec*pressure receiving area) for changing a width of a V-shaped groove defined between the fixed and movable sheaves 64a, 64b of the secondary pulley 64. That is, the secondary thrust Wsec is a thrust applied to the secondary pulley 64 from the secondary hydraulic actuator 64c, to clamp the transmission belt 66 that is mounted on the secondary pulley 64. The secondary pressure Psec is a hydraulic pressure applied from the hydraulic control unit 46 to the secondary hydraulic actuator 64c, and serves as a pulley hydraulic pressure for generating the secondary thrust Wsec.

In the continuously-variable transmission mechanism 24, the primary and secondary pressures Ppri, Psec are controlled by the hydraulic control unit 46 that is controlled by the electronic control apparatus 100, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58, input shaft 22 and primary pulley 60, and that the secondary rotational speed Nsec represents a rotational speed of the secondary shaft 62 and secondary pulley 64.

The hydraulic control unit 46 is constituted to include a plurality of control valves such as electromagnetic valves in the form of solenoid valves. The plurality of solenoid valves include an on-off solenoid valve 91 configured to control a C1 control pressure Pc1 that is applied to a hydraulic actuator C1a of the first clutch C1 and a linear solenoid valve 94 configured to control a C2 control pressure Pc2 that is applied to a hydraulic actuator C2a of the second clutch C2. The on-off solenoid valve 91 is a simple solenoid valve that is to be placed in either one of an open position and a closed position, without an operation position intermediate between the open and closed positions. It is noted that the on-off solenoid valve 91 and the linear solenoid valve 94, which are known solenoid valves, will not be described in detail.

Although not being shown in FIG. 5, the hydraulic control unit 46 includes a plurality of solenoid valves configured to directly or indirectly control a B1 control pressure Pb1 that is applied to a hydraulic actuator B1a of the first brake B1, a TWC pressure Ptwc that is applied to the hydraulic actuator 41 so as to switch the two-way clutch TWC between the one-way mode and the lock mode, a primary pressure Ppri that is applied to the hydraulic actuator 60c of the primary pulley 60, a secondary pressure Psec that is applied to the hydraulic actuator 64c of the secondary pulley 64, and a LU pressure Plu that is applied for controlling the lock-up clutch LU. In the present embodiment, each of the solenoid valves configured to control these hydraulic pressures is constituted by a linear solenoid valve.

As described above, the C1 control pressure Pc1, which is applied to the hydraulic actuator C1a of the first clutch C1, is controlled by the on-off solenoid valve 91. The on-off solenoid valve 91 is configured to receive an original pressure in the form of a modulator pressure PM that is regulated by a modulator valve (not shown), and to output the C1 control pressure Pc1 that is applied to the hydraulic actuator C1a. For example, when the on-off solenoid valve 91 is placed in its ON state, the modulator pressure PM is outputted as the C1 control pressure Pc1. When the on-off solenoid valve 91 is placed in its OFF state, the working fluid of the hydraulic actuator C1a is discharged whereby the C1 control pressure Pc1 is reduced to zero. In the on-off solenoid valve 91, the C1 control pressure Pc1 cannot be finely controlled due to the construction of the on-off solenoid valve 91. It is noted that a hydraulic circuit of the hydraulic control unit 46 is arranged such that the on-off solenoid valve 91 is connected only to the hydraulic actuator C1a of the first clutch C1, and is not connected to hydraulic actuators of other engagement devices other than the first clutch C1.

The C2 control pressure Pc2, which is applied to the hydraulic actuator C2a of the second clutch C2, is controlled by the linear solenoid valve 94. The linear solenoid valve 94 is configured to receive an original pressure in the form of the modulator pressure PM, and is capable of finely controlling the C2 control pressure Pc2 that is applied to the hydraulic actuator C2a, based on an electrical signal (command electric current) supplied to the linear solenoid valve 94.

Referring back to FIG. 1, the vehicle 10 is provided with the electronic control apparatus 100 as a controller including the control apparatus constructed according to present invention. For example, the electronic control apparatus 100 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 100 is configured to perform, for example, an engine control operation for controlling an output of the engine 12, a shifting control operation and a belt-clamping-force control operation for the continuously-variable transmission 24, and a hydraulic-pressure control operation for switching the operation state of each of the plurality of engagement devices (C1, B1, C2, TWC). The electronic control apparatus 100 may be constituted by two or more control units exclusively assigned to perform different control operations such as the engine control operation and the hydraulic-pressure control operation.

The electronic control apparatus 100 receives various input signals based on values detected by respective sensors provided in the vehicle 10. Specifically, the electronic control apparatus 100 receives: an output signal of an engine speed sensor 102 indicative of an engine rotational speed Ne which is a rotational speed of the engine 12; an output signal of a primary speed sensor 104 indicative of a primary rotational speed Npri which is a rotational speed of the primary shaft 58 which is equivalent to an input-shaft rotational speed Nin; an output signal of a secondary speed sensor 106 indicative of a secondary rotational speed Nsec which is a rotational speed of the secondary shaft 62; an output signal of an output speed sensor 108 indicative of an output-shaft rotational speed Nout which is a rotational speed of the output shaft 30 and which corresponds to the running speed V of the vehicle 10; an output signal of an input speed sensor 109 indicative of an input rotational speed Ntwcin which is a rotational speed of the input-side rotary member 68 of the two-way clutch TWC; an output signal of an accelerator-operation amount sensor 110 indicative of the above-described operation amount θacc of the accelerator pedal 45 which represents an amount of accelerating operation made by the vehicle operator, an output signal of a throttle-opening degree sensor 112 indicative of the throttle opening degree tap; an output signal of a shift position sensor 114 indicative of an operation position POSsh of a manually-operated shifting device in the form of the shift lever 98 provided in the vehicle 10; and an output signal of a temperature sensor 116 indicative of a working fluid temperature THoil that is a temperature of a working fluid in the hydraulic control unit 46. It is noted that the input-shaft rotational speed Nin (=primary rotational speed Npri) is equivalent to a rotational speed of the turbine impeller 20t of the of the torque converter 20. Further, the electronic control apparatus 100 calculates an actual gear ratio γcvt (=Npri/Nsec) that is an actual value of the gear ratio γcvt of the continuously-variable transmission 24, based on the primary rotational speed Npri and the secondary rotational speed Nsec. Moreover, the electronic control apparatus 100 calculates an output rotational speed Ntwcout of the first and second output-side rotary members 70a, 70b of the two-way clutch TWC, based on the output-shaft rotational speed Nout.

Further, the electronic control apparatus 100 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission 24, a hydraulic-control command signal Scbd for performing hydraulic controls of operation states of the plurality of engagement devices, and a hydraulic-control command signal Slu for performing hydraulic controls of an operation state of the lock-up clutch LU.

The hydraulic control unit 46, which receives the above-described hydraulic control command signals, outputs the C1 control pressure Pc1 that is applied to the hydraulic actuator C1$a$ of the first clutch C1, the B1 control pressure Pb1 that is applied to the hydraulic actuator B1$a$ of the first brake B1, the C2 control pressure Pc2 that is applied to the hydraulic actuator C2$a$ of the second clutch C2, the TWC pressure Ptwc that is applied to the hydraulic actuator 41 configured to switch the two-way clutch TWC between the one-way mode and the lock mode, the primary pressure Ppri that is applied to the hydraulic actuator 60$c$ of the primary pulley 60, the secondary pressure Psec that is applied to the hydraulic actuator 64$c$ of the secondary pulley 64, and the LU pressure Plu that is applied for controlling the lock-up clutch LU.

For performing various control operations in the vehicle 10, the electronic control apparatus 100 includes an engine control means or portion in the form of an engine control portion 120 and a transmission shifting control means or portion in the form of a transmission-shifting control portion 122.

The engine control portion 120 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 120 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 98 is switched from the parking position P or the neutral position N to the drive position D during stop of the vehicle 10, for example, the transmission-shifting control portion 122 supplies, to the hydraulic control unit 46, the hydraulic-control command signal Scbd requesting engagement of the first clutch C1, whereby the forward gear running mode is established to enable forward running of the vehicle 10 by the drive force transmitted along the first drive-force transmitting path PT1. When the operation position POSsh of the shift lever 98 is switched from the parking position P or the neutral position N to the reverse position R during stop of the vehicle 10, the transmission-shifting control portion 122 supplies, to the hydraulic control unit 46, the hydraulic-control command signal Scbd requesting engagement of the first brake B1 and switching of the two-way clutch TWC to the lock mode, whereby the reverse gear running mode is established to enable reverse running of the vehicle 10 by the drive force transmitted along the first drive-force transmitting path PT1.

During running of the vehicle 10 in the belt running mode by the drive force with the drive force transmitted along the second drive-force transmitting path PT2, for example, the transmission-shifting control portion 122 outputs the hydraulic control command signal Scvt by which the gear ratio γ of the continuously variable transmission 24 is controlled to a target gear ratio γtgt that is calculated based on, for example, the accelerator operation amount θacc and the vehicle running speed V. Specifically, the transmission-shifting control portion 122 stores therein a predetermined relationship (e.g., shifting map) which assures an appropriately adjusted belt clamping force in the continuously variable transmission 24 and which establishes the target gear ratio γtgt of the continuously variable transmission 24 that enables the engine 12 to be operated at an operating point lying on an optimum line (e.g., engine optimum-fuel-efficiency line). The transmission-shifting control portion 122 determines a target primary pressure Ppritgt as a command pressure value of the primary pressure Ppri that is to be applied to the hydraulic actuator 60$c$ of the primary pulley 60 and a target secondary pressure Psectgt as a command pressure value of the secondary pressure Psec that is to be applied to the hydraulic actuator 64$c$ of the secondary pulley 64, in accordance with the above-described stored relationship, based on the accelerator operation amount θacc and the vehicle running speed V. Thus, the transmission-shifting control portion 122 executes a shifting control of the continuously variable transmission 24, by supplying, to the hydraulic control unit 46, the hydraulic control command signal Scvt by which the primary pressure Ppri and the secondary pressure Psec are to be controlled to the target primary pressure Ppritgt and the target secondary pressure Psectgt, respectively. It is noted that the shifting control of the continuously variable transmission 24, which is a known technique, will not be described in detail.

Further, when the shift lever 98 is placed in the drive position D, the transmission-shifting control portion 122 executes a switching control operation for switching the running mode between the gear running mode (in which the drive force is to be transmitted along the first drive-force transmitting path PT1) and the belt running mode (in which the drive force is to be transmitted along the second drive-force transmitting path PT2). Specifically, the transmission-shifting control portion 122 stores therein a predetermined relationship in the form of a shifting map for shifting from one of first and second speed positions to the other, wherein the first speed position corresponds the gear ratio EL of the gear mechanism 28 in the gear running mode, and the second speed position corresponds to the highest gear ratio γmax of the continuously variable transmission 24 in the belt running mode. In the shifting map, which is constituted by, for example, the running speed V and the accelerator operation amount θacc, a shift-up line is provided for determining whether a shift-up action to the second speed position, namely, switching to the belt running mode is to be executed or not, and a shift-down line is provided for determining whether a shift-down action to the first speed position, namely, switching to the gear running mode is to be executed or not. The transmission-shifting control portion 122 determines whether the shift-up action or shift-down action is to be executed or not, by applying actual values of the running speed V and the accelerator operation amount θacc to the shifting map, and executes the shift-up action or shift-down action (namely, switches the running mode), depending on result of the determination. For example, when a running state point, which is defined by a combination of the actual values of the running speed V and the accelerator operation amount θacc, is moved across the shift-down line in the shifting map during the running in the belt running mode, for example, it is determined that there is a request (i.e., shift-down request) requesting the shift-down action to the first speed position, namely, there is a request for the switching to the gear running mode. When the running state point is moved across the shift-up line in the shifting map during the running in the gear running mode, for example, it is determined that there is a request (i.e., shift-up request) requesting the shift-up action to the second speed position, namely, there is a request for the switching to the belt running mode. It is noted that the gear running mode corresponds to "D1" (drive position D1) shown in FIG. 4 and that the belt running mode corresponds to "D2" (drive position D2) shown in FIG. 4.

For example, during the running in the gear running mode (corresponding to the drive position D1 shown in FIG. 4) with the shift lever 98 being placed in the drive position D, when determining that the request for the shift-up action to the second speed position, i.e., the switching to the belt running mode (corresponding to the drive position D2 shown in FIG. 4), is issued or made, the transmission-shifting control portion 122 outputs, to the hydraulic control unit 46, a command requesting release of the first clutch C1 and engagement of the second clutch C2, whereby the second drive-force transmitting path PT2 is established in place of the first drive-force transmitting path PT1 so that the drive force can be transmitted along the second drive-force transmitting path PT2 in the drive-force transmitting apparatus 16. That is, the transmission of the drive force along the first drive-force transmitting path PT1 is cut off, and the first drive-force transmitting path PT1 is switched to the second drive-force transmitting path PT2.

As described above, when the gear running mode (in which the drive force is transmitted along the first drive-force transmitting path PT1) is to be switched to the belt running mode (in which the drive force is transmitted along the second drive-force transmitting path PT2), the first clutch C1 is released while the second clutch C2 is engaged. Since the C1 control pressure Pc1, which is applied to the hydraulic actuator C1a of the first clutch C1, is controlled by the on-off solenoid valve 91 rather than a linear solenoid valve, the C1 control pressure Pc1 cannot be finely controlled in a switching transition from the gear running mode to the belt running mode. Therefore, there is a risk of generation of a shock in the switching transition, since it is not possible to execute a so-called "clutch-to-clutch control" in which the second clutch C2 is engaged while the first clutch C1 is released by finely controlling both of the C2 control pressure Pc2 and the C1 control pressure Pc1 in the switching transition. On the other hand, in the present embodiment of the invention, the shock generated in the switching transition from the gear running mode to the belt running mode is reduced by executing control operations in the switching transition, as described below.

For executing the above-described control operations, the electronic control apparatus 100 includes an inertia-phase determining means or portion in the form of an inertia-phase determining portion 126 and a learning control means or portion in the form of a learning control portion 128. The inertia-phase determining portion 126 and the learning control portion 128 are operated in the switching transition from the gear running mode to the belt running mode.

In the switching transition from the gear running mode to the belt running mode, the inertia-phase determining portion 126 determines whether an inertia phase is started or not. The inertia-phase determining portion 126 determines that the inertia phase is started when a rotational speed difference $\Delta Nin1$ (=|Nin1−Nin|) of the input-shaft rotational speed Nin that is constantly detected, from an initial value Nin1 of the input-shaft rotational speed Nin at a point of time at which the switching transition is started, becomes not smaller than a determination threshold value $\alpha 1$. The determination threshold value $\alpha 1$ is a predetermined value which is obtained by experimentation or determined by an appropriate design theory and based on which it can be determined that the inertia phase is started.

When it is determined by the inertia-phase determining portion 126 that the inertia phase is started, the learning control portion 128 executes learning of a command pressure value of the C2 control pressure Pc2 applied to the second clutch C2, while causing the first clutch C1 to wait to be released, during a given length T of time from start of the inertia phase. The learning control portion 128 calculates an actual change rate dN/dt (absolute value) of the input-shaft rotational speed Nin, for example, during the given length T of time from the start of the inertia phase. Then, the learning control portion 128 calculates a difference K (=β−dN/dt) between the calculated actual change rate dN/dt and a predetermined target change rate β of the input-shaft rotational speed Nin. Specifically, the learning control portion 128 calculates the difference K (=β−dN/dt), by subtracting the calculated actual change rate dN/dt from the target change rate β. When the calculated difference K is a positive value, namely, when the actual change rate dN/dt is smaller than the target change rate β, the learning control portion 128 corrects the command pressure value of the C2 control pressure Pc2, by adding a given value L1 to the command pressure value that is a value before execution of the learning of the command pressure value in the switching transition. The given value L may be either a predetermined value or a variable value that is proportional to the difference K. When the calculated difference K is a negative value, namely, when the actual change rate dN/dt is larger than the target change rate β, the learning control portion 128 corrects the command pressure value of the C2 control pressure Pc2, by subtracting a given value L2 from the command pressure value that is a value before execution of the learning of the command pressure value in the switching transition. The given value L2 may be either a predetermined value or a variable value that is proportional to an absolute value of the difference K.

During the given length T of time from the start of the inertia phase, namely, during execution of the learning of the command pressure value of the C2 control pressure Pc2 (applied to the second clutch C2) by the learning control portion 128, the first clutch C1 is not released and is held in the engaged state, so that the learning of the command pressure value of the C2 control pressure Pc2 is avoided from being executed when the first clutch C1 is placed in the released state. Therefore, the command pressure value obtained through the learning is not affected by release of the first clutch C1, so that the command pressure value corrected based on the learning has an improved reliability.

When a shift-up request requesting a shift-up action from the first speed position (gear running mode) to the second speed position (belt running mode) is established or made during running of the vehicle 10 with the shift lever 98 being placed in the drive position D, the transmission-shifting control portion 122 causes the second clutch C2 to start to be engaged with the first clutch C1 being placed in the engaged state. In this instance, the transmission-shifting control portion 122 controls the C2 control pressure Pc2 applied to the hydraulic actuator C2a of the second clutch C2 such that the applied C2 control pressure Pc2 follows the command pressure value of the C2 control pressure Pc2. The command pressure value of the C2 control pressure Pc2 is set, for example, such that the command pressure value is temporarily increased to a predetermined quick-fill pressure value Pck and is then held at a predetermined stand-by pressure value Pst. The C2 control pressure Pc2 (actual pressure value) applied to the second clutch C2 is increased so as to follow the command pressure value, whereby a torque capacity of the second clutch C2 is gradually increased. With the increase of the torque capacity of the second clutch C2, the torque transmitted along the second drive-force transmitting path PT2 through the second clutch C2 is increased. When all torque becomes to be transmitted along the second drive-force transmitting path PT2, the input-shaft rotational speed Nin is made so low that the rotational speed of the input-side rotary member 68 of the two-way clutch TWC in the vehicle forward-running direction is made lower than the rotational speed of the output-side rotary members 70 of the two-way clutch TWC in the vehicle forward-running direction, namely, the input-side rotary member 68 is rotated relative to the output-side rotary members 70 in the vehicle reverse-running direction, whereby the transmission of the drive force through the two-way clutch TWC is cut off, namely, the first drive-force transmitting path PT1 is disconnected by the two-way clutch TWC. Thus, transfer of the torque between the first and second drive-force transmitting paths PT1, PT2 is made appropriately through the two-way clutch TWC, so that it is possible to minimize or reduce the shock generated in process of the increase of the C2 control pressure Pc2 applied to the second clutch C2.

With the first drive-force transmitting path PT1 being disconnected by the two-way clutch TWC, the inertia phase is started. When it is determined by the inertia-phase determining portion 126 that the inertia phase is started, the execution of learning of the command pressure value of the C2 control pressure Pc2 (applied to the second clutch C2) is started by the learning control portion 128. During the execution of the learning of the command pressure value of the C2 control pressure Pc2, the first clutch C1 is caused to wait to be released, without the first clutch C1 being released. When the given length T of time elapses from the start of the inertia phase, the learning control portion 128 terminates the execution of the learning of the command pressure value of the C2 control pressure Pc2, and then the transmission-shifting control portion 122 causes the first clutch C1 to start to be released. Specifically, the transmission-shifting control portion 122 reduces the C1 control pressure Pc1 (applied to the first clutch C1) to zero, by switching the on-off solenoid valve 91 from the ON state to the OFF state. In this instance, although the C1 control pressure Pc1, which is controlled by the on-off solenoid valve 91, cannot be finely controlled in the transition of the C1 control pressure Pc1 to zero, the first clutch C1 is released with the first drive-force transmitting path PT1 being disconnected after the start of the inertia phase, so that it is possible to avoid a shock from being generated by the release of the first clutch C1.

During the given length T of time from the start of the inertia phase, the learning of the command pressure value of the C2 control pressure Pc2 is executed while the first clutch C1 is caused to wait to be released without the first clutch C1 being caused to be released. Thus, the learning of the command pressure value of the C2 control pressure Pc2 is avoided from being executed concurrently with release of the first clutch C1. Therefore, it is possible to prevent the learning of the command pressure value from being influenced by the release of the first clutch C1. The command pressure value, which is compensated or corrected through the learning, is used in the next execution of the shift-up action, so that the shift-up action can be executed more satisfactorily in the next execution.

When a rotational speed difference $\Delta Nin2$ ($=|Nin2-Nin|$) between the input-shaft rotational speed Nin and a synchronized rotational speed Nin2 of the input shaft 22 (that is a rotational speed of the input shaft 22 after completion of the shift-up action) becomes not larger than a determination threshold value $\alpha 2$ during the inertia phase, the transmission-shifting control portion 122 estimates that the input-shaft rotational speed Nin will become equal to the synchronized rotational speed Nin2 soon. When estimating that the input-shaft rotational speed Nin will become equal to the synchronized rotational speed Nin2, the transmission-shifting control portion 122 causes the C2 control pressure Pc2 to be more increased after a given length of delay time elapses, so that the second clutch C2 is fully engaged so as to complete the shift-up action.

FIG. 6 is a flow chart for explaining a control routine that is executed when the second drive-force transmitting path PT2 is to be established in place of the first drive-force transmitting path PT1, namely, when the shift-up action from the first speed position to the second speed position is executed during running of the vehicle 10 with the shift lever 98 placed in the drive position D. This control routine is executed in a repeated manner during running of the vehicle 10.

The control routine is initiated with step of ST1 corresponding to control function of the transmission-shifting control portion 122, which is implemented to determine whether the shift-up request that requests the shift-up action from the first speed position to the second speed position has been outputted or not. When a negative determination is made at step ST1, one cycle of execution of the control routine is completed. When an affirmative determination is made at step ST1, step ST2 corresponding to control function of the transmission-shifting control portion 122 is implemented to cause the second clutch C2 to start to be engaged while the first clutch C1 is still placed in the engaged state. Specifically, at step ST2, the C2 control pressure Pc2 applied to the second clutch C2 is increased to follow a target value that is the command pressure value of the C2 control pressure Pc2.

Step ST2 is followed by step ST3 corresponding to control function of the inertia-phase determining portion 126, which is implemented to determine whether the inertia phase has been started or not by increase of the C2 control pressure Pc2 applied to the second clutch C2. When a negative determination is made at step ST3, the control flow goes back to step ST3 so as to make the determination again as to whether the inertia phase has been started. That is, the same determination is made repeatedly until an affirmative determination is made at step ST3. When the affirmative determination is made at step ST3, step ST4 corresponding to control function of the learning control portion 128 is implemented to start the learning of the command pressure value of the C2 control pressure Pc2 applied to the second clutch C2.

Step ST4 is followed by step ST5 corresponding to control function of the learning control portion 128, which is implemented to determine whether or not the given length T of time has elapsed from the start of the inertia phase. When a negative determination is made at step ST5, the control flow goes back to step ST5 so as to make the determination again as to whether the given length T of time has elapsed. That is, the same determination is made repeatedly until an affirmative determination is made at step ST5, and the learning of the command pressure value is executed until the affirmative determination is made at step ST5. When an affirmative determination is made at step ST5, the learning of the command pressure value of the C2 control pressure Pc2 is terminated, and then step ST6 corresponding to control function of the transmission-shifting control portion 122 is implemented to cause the first clutch C1 to be released. Step ST6 is followed by step ST7 corresponding to control function of the transmission-shifting control portion 122, which is implemented to cause the second clutch C2 to be fully engaged.

FIG. 7 is a time chart showing a result of the control routine executed as shown in the flow chart of FIG. 6. In FIG. 7, ordinate axes represent, as seen from top to bottom, the input-shaft rotational speed Nin, the C1 control pressure Pc1 as the command pressure value, the C2 control pressure Pc2 as the command pressure value and presence/absence of the learning of the command pressure value of the C2 control pressure Pc2 applied to the second clutch C2, respectively. In the presence/absence of the learning of the command pressure value of the C2, "OFF" indicates that the learning of the command pressure value is not being executed, and "ON" indicates that the learning of the command pressure value is being executed.

At a point t1 of time, it is determined that the shift-up request for a shift-up action from the first speed position to the second speed position is made, and the second clutch C2 is caused to start to be engaged. As shown in FIG. 7, the command pressure value of the C2 control pressure Pc2 applied to the second clutch C2 is temporarily held at the quick-fill pressure value Pck, and is then held at the stand-by pressure value Pst. With the command pressure value being set to the quick-fill pressure value Pck, a responsiveness of the actual pressure value of the C2 control pressure Pc2 is improved, so that the actual pressure value of the C2 control pressure Pc2 follows the stand-by pressure value Pst with an improved responsiveness. With the C2 control pressure Pc2 applied to the second clutch C2 being increased, the torque capacity of the second clutch C2 is increased. At a point t2 of time, the inertia phase is started and the input-shaft rotational speed Nin starts to be reduced. From the point t2 of time, the learning of the command pressure value of the second clutch C2 is started, so that the command pressure value, for example, the stand-by pressure value Pst (shown in FIG. 7) is compensated or corrected in view of the difference K between the actual change rate dN/dt of the input-shaft rotational speed Nin and the predetermined target change rate 1 of the input-shaft rotational speed Nin. Then, at a point t3 of time at which the given length T of time has elapsed from the point t2 of time, the learning of the command pressure value is terminated. Further, at the point t3 of time, the first clutch C1 is caused to start to be released upon termination of the shifting learning. Thus, since the first clutch C1 is released during the inertia phase, a shock is not generated by the release of the first clutch C1 even if the C1 control pressure Pc1 is not finely controlled.

At a point t4 of time, the rotational speed difference ΔNin2 between the input-shaft rotational speed Nin and the synchronized rotational speed Nin2 becomes not larger than the determination threshold value α2, and it is determined that the input-shaft rotational speed Nin will shortly become equal to the synchronized rotational speed Nin2. After a given length of time has elapsed from the point t4 of time, the C2 control pressure Pc2 is gradually increased. Then, at a point t5 of time, the C2 control pressure Pc2 is increased to a pressure value Pc2on by which the second clutch C2 is to be fully engaged. With the second clutch C2 being fully engaged, the shift-up action from the first speed position to the second speed position is completed.

As described above, in the present embodiment, in the case in which the second drive-force transmitting path PT2 is to be established in place of the first drive-force transmitting path PT1 during running of the vehicle 10, the second clutch C2 is caused to start to be engaged when the first clutch C1 is still in its engaged state. Then, when all torque becomes transmittable along the second drive-force transmitting path PT2 with increase of the torque capacity of the second clutch C2, the first drive-force transmitting path PT1 is disconnected by the two-way clutch TWC whereby the drive-force transmitting path along which the torque is transmitted is switched from the first drive-force transmitting path PT1 to the second drive-force transmitting path PT2. Thus, transfer of the torque between the first and second drive-force transmitting paths PT1, PT2 is made appropriately through the two-way clutch TWC, so that it is possible to minimize or reduce a shock generated in process of the transfer of the torque between the first and second drive-force transmitting paths PT1, PT2. Further, when the drive-force transmitting path along which the torque is transmitted has been switched to the second drive-force transmitting path PT2, the inertia phase is started. With the first clutch C1 being released after the inertia phase is started, namely, with the first clutch C1 being switched from its engaged state to its released state while the first drive-force transmitting path PT1 is being disconnected by the two-way clutch TWC, it is possible to avoid generation of a shock in process of the release of the first clutch C1, even if the C1 control pressure Pc1 applied to the first clutch C1 is not finely controlled by the on-off solenoid valve 91. Thus, although the C1 control pressure Pc1 applied to the first clutch C1 is controlled by the on-off solenoid valve 91, it is possible to reduce a shock generated in the switching transition from the first drive-force transmitting path PT1 to the second drive-force transmitting path PT2. Moreover, since the C1 control pressure Pc1 applied to the first clutch C1 is controlled by the on-off solenoid valve 91, the manufacturing cost can be made lower than in an arrangement in which the C1 control pressure Pc1 applied to the first clutch C1 is controlled by a linear solenoid valve.

Further, in the present embodiment, during the given length T of time from the start of the inertia phase, the learning of the command pressure value of the C2 control pressure Pc2 applied to the second clutch C2 is executed while the first clutch C1 is caused to wait to be released without the first clutch C1 being caused to be released. Thus, the learning of the command pressure value of the C2 control pressure Pc2 is avoided from being executed concurrently with release of the first clutch C1.

While the preferred embodiment of this invention has been described in detail by reference to the drawings, it is to be understood that the invention may be otherwise embodied.

For example, in the above-described embodiment, the drive-force transmitting apparatus 16 defines the first and second drive-force transmitting paths ST1, ST2 provided in parallel with each other between the input shaft 22 and the output shaft 30, such that the first drive-force transmitting path PT1 is provided with the first clutch C1 and the two-way clutch TWC while the second drive-force transmitting path PT2 is provided with the continuously variable transmission 24 and the second clutch C2. However, the above-described construction or arrangement of the drive-force transmitting apparatus 16 is not essential for the present invention. The present invention is applicable to any drive-force transmitting apparatus that is to be provided in a vehicle, wherein the drive-force transmitting apparatus includes an input shaft, an output shaft and first, second and third engagement devices, and defines a plurality of drive-force transmitting paths that are provided with the engagement devices.

Further, the present invention is applicable also to a drive-force transmitting apparatus including a step-variable automatic transmission that is constituted by a plurality of planetary gear devices and a plurality of engagement devices. In the step-variable automatic transmission, each one of a plurality of speed positions is selectively established by a corresponding one of combinations of operation states of the engagement devices. It is possible to interpret that the step-variable automatic transmission defines the same number of drive-force transmitting paths as the speed positions established therein wherein each of the different drive-force transmitting paths is to be established when a corresponding one of the speed positions is established. In the step-variable automatic transmission included in the drive-force transmitting apparatus, to which the present invention is applicable, two of the engagement devices corresponding to the first and third engagement devices are provided in series in one of the drive-force transmitting paths which is to be established when a particular one of the speed positions is established, wherein the engagement device corresponding to the first engagement device is to be operated by a hydraulic pressure controlled by an on-off solenoid valve. That is, the present invention is applicable to such a drive-force transmitting apparatus, particularly, to a case in which a shifting action is executed to switch from the above-described particular one of the speed positions to another of the speed positions.

In the above-described embodiment, the learning of the command pressure value of the C2 control pressure Pc2 applied to the second clutch C2 is terminated when the given length T of time elapses from the start of the inertia phase. However, the learning of the command pressure value does not necessarily have to be terminated upon elapse of the given length T of time. For example, the learning control portion 128 may include a function of determining whether the learning of the command pressure value should be terminated or not, such that the learning of the command pressure value is terminated upon determination that the learning should be terminated.

In the above-described embodiment, the stand-by pressure value Pst as the command pressure value of the C2 control pressure Pc2 applied to the second clutch C2 in the switching transition is compensated or corrected by the learning control portion 128. However, the command pressure value, which is to be corrected, does not necessarily have to be the stand-by pressure value Pst. Further, a value related to the command pressure value of the C2 control pressure Pc2 may be corrected through the learning. For example, the quick-fill pressure value Pck as the command pressure value of the C2 control pressure Pc2, a length of time for which the command pressure value of the C2 control pressure Pc2 is held at the quick-fill pressure value Pck, and/or a length of delay time from the determination of the shift-up request until the start of increase of the C2 control pressure Pc2 may be corrected through the learning. Each of the length of time for which the command pressure value of the C2 control pressure Pc2 is held at the quick-fill pressure value Pck and the length of delay time from the determination of the shift-up request until the start of increase of the C2 control pressure Pc2 corresponds to "value related to the command pressure value of the hydraulic pressure" which is recited in the appended claims.

In the above-described embodiment, during the given length T of time from the start of the inertia phase, the first clutch C1 is held in the engaged state, and the learning of the command pressure value of the C2 control pressure Pc2 (applied to the second clutch C2) is executed. However, where the learning of the command pressure value of the C2 control pressure Pc2 is not executed, the first clutch C1 may be released immediately after the start of the inertia phase. That is, the release of the first clutch C1 may be made at any moment after the start of the inertia phase, namely, during the inertia phase.

In the above-described embodiment, the third engagement device is constituted by the two-way clutch TWC that is to be placed in a selected one of the one-way mode and the lock mode, such that the two-way clutch TWC transmits the drive force during the driving state of the vehicle 10 and cuts off transmission of the drive force during the driven state of the vehicle 10 when the two-way clutch TWC is placed in the one-way mode, and such that the two-way clutch TWC transmits the drive force during the driving state and during the driven state when the two-way clutch TWC is placed in the lock mode. However, the third engagement device does not necessarily have to be constituted by a two-way clutch having such a construction, but may be constituted, for example, by a conventional one-way clutch that is configured to transmit the drive force during the driving state and to cut off transmission of the drive force during the driven state. Further, where the third engagement device is constituted by a two-way clutch, the two-way clutch may have a construction that is not particularly limited to the details of the above-described two-way clutch TWC.

It is to be understood that the embodiment described above is given for illustrative purpose only, and that the present invention may be embodied with various modifications and improvements which may occur to those skilled in the art.

NOMENCLATURE OF ELEMENTS

16: drive-force transmitting apparatus
22: input shaft
24: continuously variable transmission
30: output shaft
91: on-off solenoid valve
94: linear solenoid valve
100: electronic control apparatus (control apparatus)
122: transmission-shifting control portion
128: learning control portion
PT1: first drive-force transmitting path
PT2: second drive-force transmitting path
C1: first clutch (first engagement device, engagement device)
C2: second clutch (second engagement device, engagement device)
TWC: two-way clutch (third engagement device, engagement device)
T: given length of time

What is claimed is:

1. A control apparatus for a drive-force transmitting apparatus that is to be provided in a vehicle,
   wherein the drive-force transmitting apparatus includes an input shaft, an output shaft and first, second and third engagement devices, and defines a plurality of drive-force transmitting paths that are provided between the input shaft and the output shaft,
   wherein the plurality of drive-force transmitting paths include a first drive-force transmitting path and a second drive-force transmitting path, such that the first drive-force transmitting path is provided with the first and third engagement devices, and such that the third engagement device is located between the first engagement device and the output shaft in the first drive-force transmitting path, wherein the first drive-force transmitting path is established by engagement of the first engagement device operated by a hydraulic pressure which is applied to the first engagement device and which is controlled by an on-off solenoid valve, such that a drive force is to be transmitted along the first drive-force transmitting path through the first and third engagement devices when the first drive-force transmitting path is established, wherein the second drive-force transmitting path is established by engagement of the second engagement device operated by a hydraulic pressure which is applied to the second engagement device and which is controlled by a linear solenoid valve, such that the drive force is to be transmitted along the second drive-force transmitting path through the second engagement device when the second drive-force transmitting path is established, wherein the third engagement device is configured to transmit the drive force during a driving state of the vehicle and to cut off transmission of the drive force during a driven state of the vehicle, and wherein said control apparatus comprises a transmission-shifting control portion configured, in a case in which the second drive-force transmitting path is to be established in place of the first drive-force transmitting path during running of the vehicle, to cause the second engagement device to be engaged when the first engagement device is engaged, and to cause the first engagement device to be released after an inertia phase is started.

2. The control apparatus according to claim 1, comprising a learning control portion which is configured to execute learning of a command pressure value of the hydraulic pressure applied to the second engagement device during a given length of time from start of the inertia phase, and to cause the first engagement device to wait to be released, without causing the first engagement device to be released, during said given length of time from the start of the inertia phase.

3. The control apparatus according to claim 1,
wherein the first and second drive-force transmitting paths are provided in parallel with each other, and
wherein the drive-force transmitting apparatus further includes a continuously variable transmission that is provided in the second drive-force transmitting path.

4. The control apparatus according to claim 1,
wherein the third engagement device is to be placed in a selected one of a one-way mode and a lock mode, such that the third engagement device is configured to transmit the drive force during the driving state of the vehicle and to cut off transmission of the drive force during the driven state of the vehicle when the third engagement device is placed in the one-way mode, and such that the third engagement device is configured to transmit the drive force during the driving state of the vehicle and during the driven state of the vehicle when the third engagement device is placed in the lock mode.

5. The control apparatus according to claim 1,
wherein said transmission-shifting control portion is configured, in said case in which the second drive-force transmitting path is to be established in place of the first drive-force transmitting path during the running of the vehicle, to cause the first engagement device to be released after a rotational speed of the input shaft of the drive-force transmitting apparatus starts to be changed by engagement of the second engagement device.

6. The control apparatus according to claim 2,
wherein said learning control portion is configured to obtain an actual rate of change of a rotational speed of the input shaft which is caused by engagement of the second engagement device, and to correct the command pressure value of the hydraulic pressure or a value related to the command pressure value of the hydraulic pressure, depending on a difference between the obtained actual rate and a target rate of the change of the rotational speed of the input shaft.

7. The control apparatus according to claim 1,
wherein the third engagement device includes an input-side rotary portion and an output-side rotary portion such that rotation is to be transmitted between the input shaft and the input-side rotary portion along the first drive-force transmitting path and such that rotation is to be transmitted between the output-side rotary portion and the output shaft along the first drive-force transmitting path, and
wherein the input-side rotary portion is inhibited from being rotated in a predetermined one of opposite directions relative to the output-side rotary portion and is allowed to be rotated in the other of the opposite directions relative to the output-side rotary portion.

8. The control apparatus according to claim 7,
wherein the input-side rotary portion of the third engagement device is connected to a first rotary element and is to be rotated integrally with the first rotary element,
wherein the output-side rotary portion of the third engagement device is connected to a second rotary element and is to be rotated integrally with the second rotary element, and
wherein, when the first and second engagement devices are both engaged and the input shaft is rotated, the first and second rotary elements are both rotated such that a rotational speed of the second rotary element is higher than a rotational speed of the first rotary element, whereby the input-side rotary portion of the third engagement device is rotated in said other of the opposite directions relative to the output-side rotary portion of the third engagement device.

9. The control apparatus according to claim 1,
wherein the second drive-force transmitting path provides a second gear ratio between the input and output shafts, and the first drive-force transmitting path provides a first gear ratio between the input and output shafts, such that the second gear ratio is lower than the first gear ratio.

* * * * *